(12) United States Patent
Lin et al.

(10) Patent No.: US 10,560,714 B2
(45) Date of Patent: Feb. 11, 2020

(54) PICTURE PREDICTION METHOD AND PICTURE PREDICTION APPARATUS

(71) Applicant: HUAWEI TECHNOLOGIES CO., LTD., Shenzhen, Guangdong (CN)

(72) Inventors: Sixin Lin, Shenzhen (CN); Ruopu Huang, Shenzhen (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 208 days.

(21) Appl. No.: 15/855,005

(22) Filed: Dec. 27, 2017

(65) Prior Publication Data
US 2018/0139468 A1    May 17, 2018

Related U.S. Application Data

(63) Continuation of application No. PCT/CN2016/087750, filed on Jun. 29, 2016.

(30) Foreign Application Priority Data

Jul. 3, 2015 (CN) .......................... 2015 1 0391765

(51) Int. Cl.
*H04N 19/52* (2014.01)
*H04N 19/159* (2014.01)
(Continued)

(52) U.S. Cl.
CPC .......... *H04N 19/52* (2014.11); *H04N 19/159* (2014.11); *H04N 19/176* (2014.11); *H04N 19/56* (2014.11)

(58) Field of Classification Search
CPC ...... H04N 19/52; H04N 19/56; H04N 19/176; H04N 19/159; H04N 19/523;
(Continued)

(56) References Cited

U.S. PATENT DOCUMENTS

| 6,058,212 A | 5/2000 | Yokoyama |
| 6,249,547 B1 | 6/2001 | Boyce et al. |

(Continued)

FOREIGN PATENT DOCUMENTS

| CN | 1177259 A | 3/1998 |
| CN | 101009841 A | 8/2007 |

(Continued)

OTHER PUBLICATIONS

Huang, Han et al. Affine Skip and Direct modes for effifcient video coding, Visual Communications and Image Processing. 2012 IEEE Nov. 30, 2012. pp. 1-6.

(Continued)

*Primary Examiner* — James M Pontius
(74) *Attorney, Agent, or Firm* — Fish & Richardson P.C.

(57) ABSTRACT

A picture prediction method includes: determining motion vectors of W control points in a current picture block; obtaining motion vectors of P pixel units of the current picture block by using a motion model and the motion vectors of the W control points, where precision of the determined motion vectors of the W control points is 1/n of pixel precision, precision of the motion vector of each of the P pixel units is 1/N of the pixel precision, the motion vector of each of the P pixel units is used to determine a corresponding reference pixel unit in a reference picture of a corresponding pixel unit; and performing interpolation filtering on a pixel of the corresponding reference pixel unit by using an interpolation filter with a phase of Q, to obtain a predicted pixel value of each of the P pixel units.

27 Claims, 6 Drawing Sheets

(51) Int. Cl.
*H04N 19/176* (2014.01)
*H04N 19/56* (2014.01)

(58) Field of Classification Search
CPC .. H04N 19/537; H04N 19/513; H04N 19/182; H04N 19/117; H04N 19/105; H04N 19/80; H04N 19/635; H04N 19/54; H04N 19/51; H04N 19/50; H04N 19/426; H04N 19/172

See application file for complete search history.

(56) References Cited

U.S. PATENT DOCUMENTS

| | | | |
|---|---|---|---|
| 7,317,839 | B2 | 1/2008 | Holcomb |
| 7,349,012 | B2 | 3/2008 | Takezawa et al. |
| 7,953,152 | B1 | 5/2011 | Ameres et al. |
| 2001/0014119 | A1 | 8/2001 | Chun et al. |
| 2003/0169931 | A1 | 9/2003 | Lainema |
| 2005/0105617 | A1 | 5/2005 | Chono |
| 2007/0189386 | A1 | 8/2007 | Imagawa et al. |
| 2010/0034477 | A1 | 2/2010 | Crisan et al. |
| 2010/0118963 | A1 | 5/2010 | Nakagami et al. |
| 2010/0171968 | A1 | 7/2010 | Takagi et al. |
| 2011/0103487 | A1 | 5/2011 | Pateux et al. |
| 2012/0093226 | A1 | 4/2012 | Chien et al. |
| 2013/0121416 | A1 | 5/2013 | He et al. |
| 2013/0148734 | A1 | 6/2013 | Nakamura |
| 2013/0163668 | A1 | 6/2013 | Chen et al. |
| 2013/0182770 | A1 | 7/2013 | Kondo |
| 2013/0329796 | A1 | 12/2013 | Chen et al. |
| 2014/0086305 | A1 | 3/2014 | Esenlik et al. |
| 2015/0078448 | A1 | 3/2015 | Puri et al. |
| 2015/0131905 | A1 | 5/2015 | Sato et al. |
| 2015/0243045 | A1* | 8/2015 | Ra .................... A61B 6/032 382/131 |
| 2015/0319445 | A1 | 11/2015 | Tanizawa et al. |
| 2016/0292849 | A1* | 10/2016 | Lee .................... G06T 11/008 |
| 2017/0048542 | A1 | 2/2017 | Sato |
| 2017/0188041 | A1 | 6/2017 | Li et al. |
| 2017/0195685 | A1 | 7/2017 | Chen et al. |
| 2017/0295377 | A1 | 10/2017 | Minezawa et al. |
| 2017/0347116 | A1 | 11/2017 | Lin et al. |
| 2018/0131932 | A1 | 5/2018 | Lin et al. |
| 2018/0139468 | A1 | 5/2018 | Lin et al. |
| 2018/0192069 | A1* | 7/2018 | Chen .................... H04N 19/52 |
| 2018/0255297 | A1 | 9/2018 | Moriya et al. |
| 2018/0270500 | A1* | 9/2018 | Li .................... H04N 19/54 |
| 2018/0316929 | A1* | 11/2018 | Li .................... H04N 19/105 |
| 2019/0028731 | A1* | 1/2019 | Chuang ............. H04N 19/105 |
| 2019/0082191 | A1* | 3/2019 | Chuang ............. H04N 19/513 |
| 2019/0116376 | A1* | 4/2019 | Chen .................... H04N 19/176 |
| 2019/0230361 | A1* | 7/2019 | Zhang .................... H04N 19/109 |
| 2019/0230376 | A1* | 7/2019 | Hu .................... H04N 19/105 |

FOREIGN PATENT DOCUMENTS

| | | |
|---|---|---|
| CN | 101175207 A | 5/2008 |
| CN | 101540902 A | 9/2009 |
| CN | 101902632 A | 12/2010 |
| CN | 102316317 A | 1/2012 |
| CN | 102577388 A | 7/2012 |
| CN | 103039075 A | 4/2013 |
| CN | 103190148 A | 7/2013 |
| CN | 103782599 A | 5/2014 |
| CN | 104012096 A | 8/2014 |
| CN | 104219520 A | 12/2014 |
| CN | 104363451 A | 2/2015 |
| CN | 104539966 A | 4/2015 |
| CN | 104539969 A | 4/2015 |
| CN | 104584555 A | 4/2015 |
| CN | 104661031 A | 5/2015 |
| CN | 106331722 A | 1/2017 |
| EP | 1073276 A2 | 1/2001 |
| EP | 2785056 A1 | 10/2014 |
| JP | 2012010313 A | 1/2012 |
| RU | 2302707 C2 | 7/2007 |
| RU | 2506713 C2 | 2/2014 |
| RU | 2509439 C2 | 3/2014 |
| RU | 2512130 C2 | 4/2014 |
| RU | 2523071 C1 | 7/2014 |
| RU | 2547457 C1 | 4/2015 |
| WO | 2006137253 A1 | 12/2006 |
| WO | 2007088793 A1 | 8/2007 |
| WO | 2011053655 A2 | 5/2011 |
| WO | 2012043841 A1 | 4/2012 |
| WO | 2013184810 A1 | 12/2013 |

OTHER PUBLICATIONS

Matthias Narroschke et al. Extending HEVC by an affine motion model. IEEE PCS 2013. pp. 321-324.

ITU-T H.264, Telecommunication Standardization Sector of ITU, Series H: Audiovisual and Multimedia Systems Infrastructure of audiovisual services—Coding of moving video, Advanced video coding for generic audiovisual services. Feb. 2014. total 790 pages.

Series H: Audiovisual and Multimedia Systems Infrastructure of audiovisual services—Coding of moving video, High efficiency video coding, Recommendation ITU-T H.265, Apr. 2015, 634 pages.

International Search Report and Written Opinion in International Application No. PCT/CN2016/087750, dated Sep. 14, 2016, 17 pages.

Chinese Office Action issued in Chinese Application No. 201510391765.7 dated Aug. 31, 2018, 6 pages.

Huang Han et al: "Control-Point Representation and Differential Coding Affine-Motion Compensation", IEEE Transactions on Circuits and Systems for Video Technology, vol. 23, No. 10, Oct. 1, 2013, XP011528531, 10 pages.

Hao Lv et al: "A comparison of fractional-pel interpolation filters in HEVC and H.264/AVC", Visual Communications and Image Processing(VCIP), 2012 IEEE, IEEE, Nov. 27, 2012, XP032309181, 6 pages.

Luo J et al: "Motion vector scaling for non-uniform interpolation offset",7. JCT-VC Meeting; 98. MPEG Meeting; Nov. 21, 2011-Nov. 30, 2011;Geneva; (Joint Collaborative Team on Video Coding of ISO/IEC JTC1/SC29/WG11 and ITU-T SG. 16), No. JCTVC-G699, Nov. 9, 2011, XP030110683, 4 pages.

Marta Karczewicz et al: "Interpolation Solution with Low Encoder Memory Requirements and Low Decoder Complexity", 14. VCEG Meeting; Sep. 24, 2001-Sep. 27, 2001;Santa Barbara, California, US;(Video Coding Experts Group of ITU-T SG.16), No. VCEG-N31 r1, Oct. 1, 2001, XP030003281, 11 pages.

Wedi T: "Complexity Reduced Motion Compensated Prediction with ⅛-pel Displacement Vector Resolution", ITU Study Group 16—Video-Coding Experts Group, No. vceg-I20, Jan. 9, 2001, XP002372038, 9 pages.

Extended European Search Report issued in European Application No. 168207793 dated Apr. 24, 2018, 12 pages.

Office Action issued in Russian Application No. 2018/143,851, dated Jun. 29, 2016, 48 pages (With English translation).

Russian Office Action issued in Russian Application No. 2018103787108(005543) dated Oct. 11, 2018, 27 pages.

Office Action issued in Chinese Application No. 201680037454.3 dated Apr. 15, 2019, 3 pages.

Search Report issued in Chinese Application No. 201680037454.3 dated Apr. 4, 2019, 4 pages.

Satoru Sakazume:"Description of video coding technology proposal by JVC", Joint Collaborative Team on Video Coding (JCT-VC) of ITU-T SG16 WP3 and ISO/IEC JTC1/SC29/WG11, JCTVC-A108. Dresden, DE, Apr. 15-23, 2010. 49 pages.

Chinese Office Action issued in Chinese Application No. 2017-567571 dated Feb. 8, 2019, 7 pages.

* cited by examiner

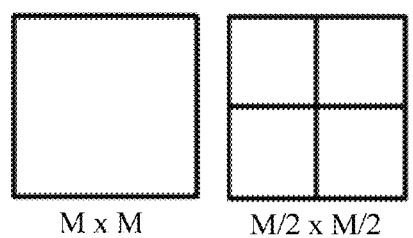
FIG. 1-a
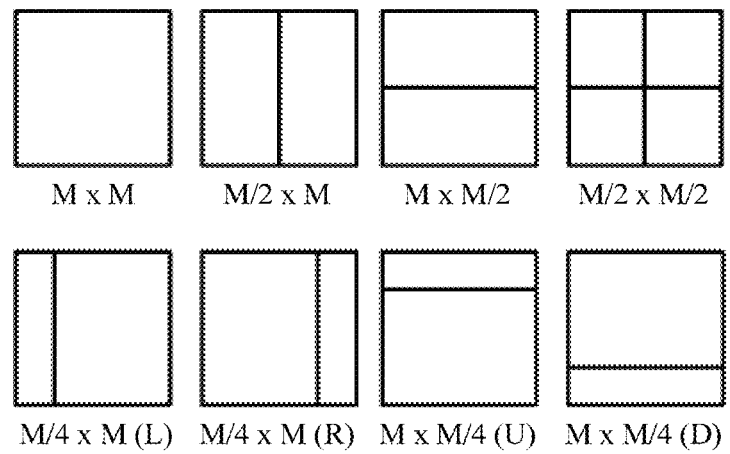
FIG. 1-b

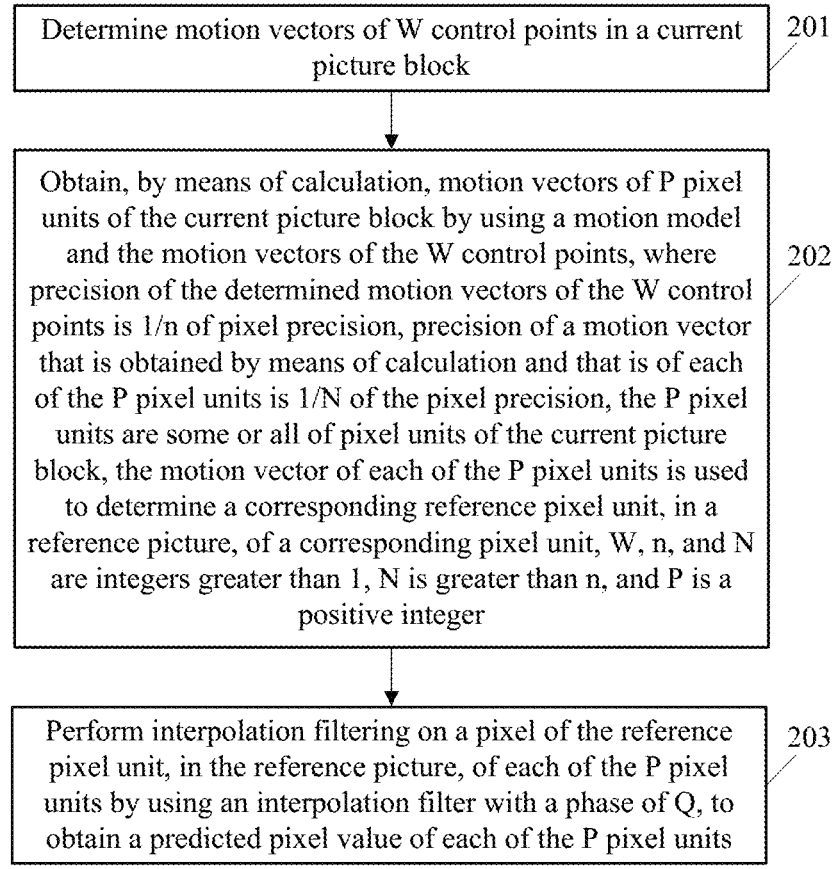
FIG. 2-a
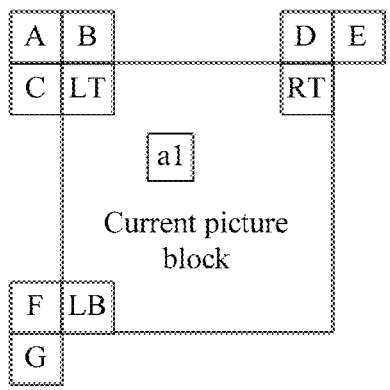
FIG. 2-b

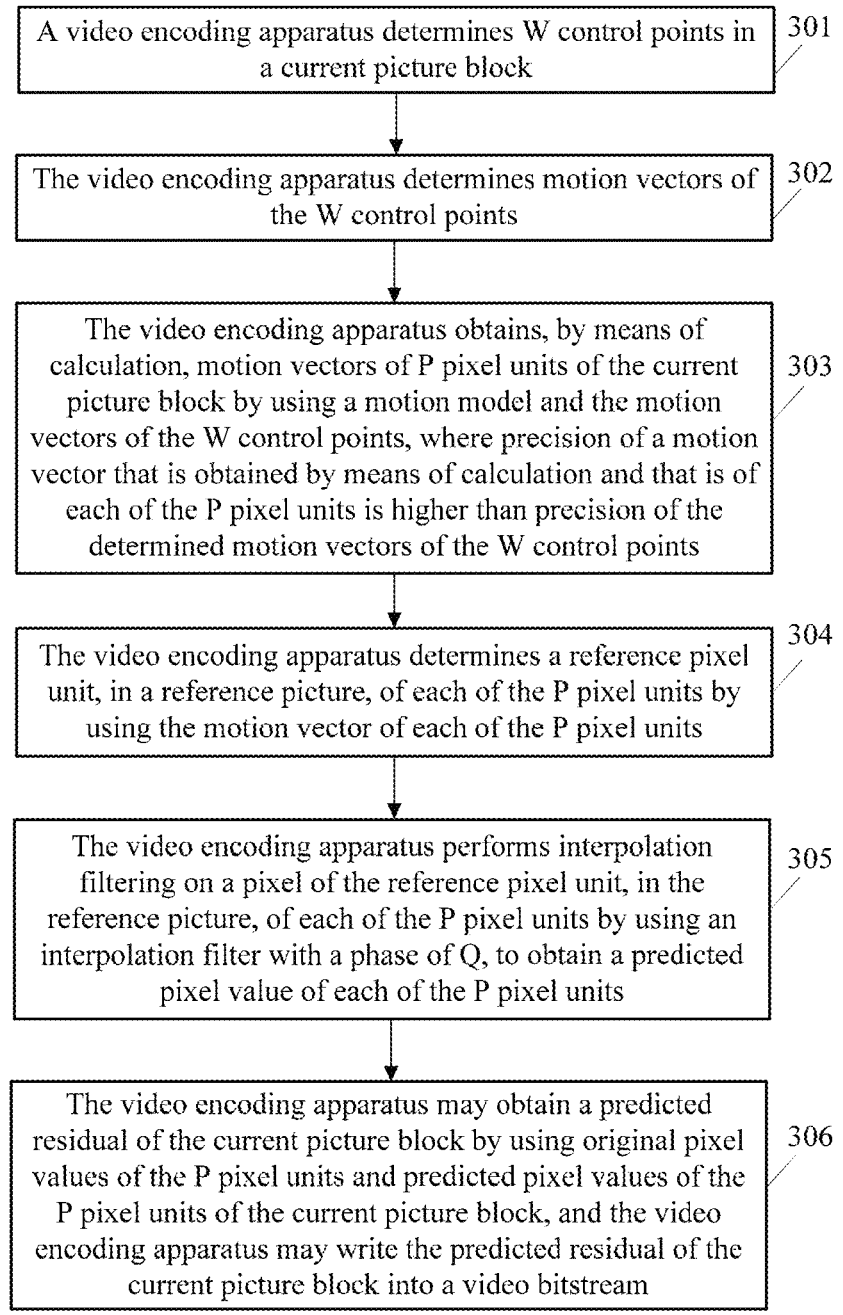
FIG. 3-a

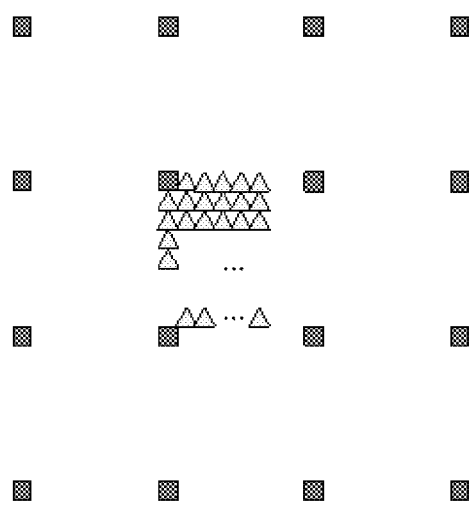
FIG. 3-b

PICTURE PREDICTION METHOD AND PICTURE PREDICTION APPARATUS

CROSS-REFERENCE TO RELATED APPLICATIONS

This application is a continuation of International Application No. PCT/CN2016/087750, filed on Jun. 29, 2016, which claims priority to Chinese Patent Application No. 201510391765.7, filed on Jul. 3, 2015. The disclosures of the aforementioned applications are hereby incorporated by reference in their entireties.

TECHNICAL FIELD

The present disclosure relates to the field of video encoding and video decoding, and specifically, to a picture prediction method and a related device.

BACKGROUND

With development of an optoelectronic collection technology and an increasing requirement for a high-definition digital video, a video data volume becomes increasingly large. Limited heterogeneous transmission bandwidth and diversified video applications impose a higher requirement on video coding efficiency. In this case, the High Efficiency Video Coding (HEVC) standard starts to be formulated as required.

A basic principle of video coding compression is using correlation between a space domain, a time domain, and a codeword to eliminate redundancy as much as possible. At present, a common manner is using a block-based hybrid video coding framework to implement video coding compression by means of steps such as prediction (including intra-frame prediction and inter-frame prediction), transformation, quantization, and entropy coding. This coding framework is powerful, and the block-based hybrid video coding framework is also used for HEVC.

In various video encoding/decoding schemes, motion estimation/motion compensation is a key technology affecting encoding/decoding performance. In many existing video encoding/decoding schemes, it is generally assumed that a motion of an object meets a requirement of a translational motion model, and various parts of the entire object are in a same motion. An existing motion estimation/motion compensation algorithm is basically a block-based motion compensation algorithm based on a translational motion model (English: translational motion model). Existing inter-frame prediction is mainly block-based motion compensation (English: motion compensation) prediction based on a translational motion model. Some non-translational motion models (for example, an affine motion model) designed for non-translational motions gradually emerge.

In a prediction mechanism based on an affine motion model, low-precision motion vectors of two control points in a current picture block and the affine motion model may be used to perform pixel value prediction in the prior art, so as to obtain a low-precision predicted pixel value of the current picture block. During a process of the pixel value prediction, an interpolation filter needs to be used to perform an interpolation filtering operation. Precision of the obtained predicted pixel value of the current picture block is the same as precision of the motion vectors of the two control points. If a higher-precision predicted pixel value of the current picture block needs to be obtained, a bilinear interpolation filter is further required to perform secondary interpolation filtering on the obtained lower-precision predicted pixel value of the current picture block.

In the prior art, if the lower-precision motion vectors of the two control points and the affine motion model are used to obtain the higher-precision predicted pixel value of the current picture block, at least two interpolation filtering operations need to be performed (a relatively large quantity of intermediate caches and memory operations are required for each interpolation filtering operation). As a result, a relatively large quantity of intermediate caches and memory operations may be required during an entire picture prediction process, and calculation complexity becomes relatively high.

SUMMARY

Embodiments of the present disclosure provide a picture prediction method and a related device, so as to reduce a quantity of intermediate caches and memory operations that are required for interpolation filtering during a picture prediction process, and reduce calculation complexity during the picture prediction process.

A first aspect of the embodiments of the present disclosure provides a picture prediction method, including:
determining motion vectors of W control points in a current picture block;
obtaining, by means of calculation, motion vectors of P pixel units of the current picture block by using a motion model and the motion vectors of the W control points, where precision of the determined motion vectors of the W control points is 1/n of pixel precision, precision of the motion vector that is obtained by means of calculation and that is of each of the P pixel units is 1/N of the pixel precision, the P pixel units are some or all of pixel units of the current picture block, the motion vector of each of the P pixel units is used to determine a corresponding reference pixel unit, in a reference picture, of a corresponding pixel unit, W, n, and N are integers greater than 1, N is greater than n, and P is a positive integer; and
performing interpolation filtering on a pixel of the corresponding reference pixel unit, in the reference picture, of each of the P pixel units by using an interpolation filter with a phase of Q, to obtain a predicted pixel value of each of the P pixel units, where Q is an integer greater than n.

With reference to the first aspect, in a first possible implementation of the first aspect, a value of N is a preset fixed value, and Q is less than or equal to N.

With reference to the first aspect or the first possible implementation of the first aspect, in a second possible implementation of the first aspect, a horizontal component or a vertical component of one of the motion vectors of the W control points is amplified N times in the motion model by using N, or a component difference between motion vectors of any two of the W control points is amplified N times in the motion model by using N.

With reference to the first aspect, the first possible implementation of the first aspect, or the second possible implementation of the first aspect, in a third possible implementation of the first aspect, the performing interpolation filtering on a pixel of the corresponding reference pixel unit, in the reference picture, of each of the P pixel units by using an interpolation filter with a phase of Q includes:
obtaining, by means of calculation, a phase of each of the P pixel units by using the motion vector of each of the P pixel units; determining, based on the phase of each pixel unit, the interpolation filter with the phase of Q that is corresponding to the corresponding pixel unit, where a filter coefficient used by the interpolation filter is corresponding to the phase; and performing interpolation filtering on the pixel of the corresponding reference pixel unit, in the reference picture, of each pixel unit by using the determined interpolation filter with the phase of Q that is corresponding to the corresponding pixel unit.

With reference to the third possible implementation of the first aspect, in a fourth possible implementation of the first aspect, the obtaining, by means of calculation, a phase of each of the P pixel units by using the motion vector of each of the P pixel units includes: obtaining, by means of calculation, the phase of each of the P pixel units according to the following formula by using the motion vector of each of the P pixel units:

$X'=abs(v_{Nx})\%N$, or $X'=v_{Nx}\&((1\leq M)-1)$;

where $Y'=abs(v_{Ny})\%N$, or $Y'=v_{Ny}\&((1\leq M)-1)$;

M is equal to $\log_2 N$ when N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

With reference to the third possible implementation of the first aspect or the fourth possible implementation of the first aspect, in a fifth possible implementation of the first aspect, the phase includes a horizontal phase and a vertical phase; and the determining, based on the phase of each pixel unit, the interpolation filter with the phase of Q that is corresponding to the pixel unit includes: determining, based on the horizontal phase of each pixel unit, a horizontal interpolation filter with a phase of Q that is corresponding to the corresponding pixel unit; and determining, based on the vertical phase of each pixel unit, a vertical interpolation filter with a phase of Q that is corresponding to the corresponding pixel unit, where a filter coefficient used by the horizontal interpolation filter is corresponding to the horizontal phase, and a filter coefficient used by the vertical interpolation filter is corresponding to the vertical phase.

With reference to the fifth possible implementation of the first aspect, in a sixth possible implementation of the first aspect, the performing interpolation filtering on the pixel of the corresponding reference pixel unit, in the reference picture, of each pixel unit by using the determined interpolation filter with the phase of Q that is corresponding to the pixel unit includes:

performing horizontal interpolation filtering on a pixel of a corresponding reference pixel unit, in the reference picture, of a pixel unit i by using a determined horizontal interpolation filter with a phase of Q that is corresponding to the pixel unit i, to obtain a horizontal interpolation filtering result; and performing vertical interpolation filtering on the horizontal interpolation filtering result by using a determined vertical interpolation filter with a phase of Q that is corresponding to the pixel unit i, to obtain a predicted pixel value of the pixel unit i, where the pixel unit i is any one of the P pixel units; or performing vertical interpolation filtering on a pixel of a corresponding reference pixel unit, in the reference picture, of a pixel unit j by using a determined vertical interpolation filter with a phase of Q that is corresponding to the pixel unit j, to obtain a vertical interpolation filtering result; and performing horizontal interpolation filtering on the vertical interpolation filtering result by using a determined horizontal interpolation filter with a phase of Q that is corresponding to the pixel unit j, to obtain a predicted pixel value of the pixel unit j, where the pixel unit j is any one of the P pixel units.

With reference to any one of the first aspect, or the first to the sixth possible implementations of the first aspect, in a seventh possible implementation of the first aspect, the motion model is a translational motion model, an affine motion model, a rotational motion model, a parabolic motion model, a shearing motion model, a zooming motion model, a perspective motion model, or a bilinear motion model.

With reference to any one of the first aspect, or the first to the seventh possible implementations of the first aspect, in an eighth possible implementation of the first aspect, the motion model is represented as follows when W is equal to 2:

$$\begin{cases} v_{Nx} = \left( \frac{(v_{1x}-v_{0x})\times N}{L}x - \frac{(v_{1y}-v_{0y})\times N}{L}y + Nv_{0x} \right)/n \\ v_{Ny} = \left( \frac{(v_{1y}-v_{0y})\times N}{L}x + \frac{(v_{1x}-v_{0x})\times N}{L}y + Nv_{0y} \right)/n \end{cases} ; \text{or}$$

$$\begin{cases} v_{Nx} = \frac{(v_{1x}-v_{0x})\times (N/n)}{L}x - \frac{(v_{1y}-v_{0y})\times (N/n)}{L}y + (N/n)v_{0x} \\ v_{Ny} = \frac{(v_{1y}-v_{0y})\times (N/n)}{L}x + \frac{(v_{1x}-v_{0x})\times (N/n)}{L}y + (N/n)v_{0y} \end{cases},$$

L represents a width or a height of the current picture block, $(v_{0x},v_{0y})$ and $(v_{1x},v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

With reference to any one of the first aspect, or the first to the seventh possible implementations of the first aspect, in a ninth possible implementation of the first aspect, the motion model is represented as follows when W is equal to 3:

$$\begin{cases} v_{Nx} = \left( \frac{(v_{1x}-v_{0x})\times N}{w}x + \frac{(v_{2x}-v_{0x})\times N}{h}y + Nv_{0x} \right)/n \\ v_{Ny} = \left( \frac{(v_{1y}-v_{0y})\times N}{w}x + \frac{(v_{2y}-v_{0y})\times N}{h}y + Nv_{0y} \right)/n \end{cases} ; \text{or}$$

$$\begin{cases} v_{Nx} = \frac{(v_{1x}-v_{0x})\times (N/n)}{w}x + \frac{(v_{2x}-v_{0x})\times (N/n)}{h}y + (N/n)v_{0x} \\ v_{Ny} = \frac{(v_{1y}-v_{0y})\times (N/n)}{w}x + \frac{(v_{2y}-v_{0y})\times (N/n)}{h}y + (N/n)v_{0y} \end{cases},$$

where $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x}, v_{0y})$, $(v_{1x}, v_{1y})$, and $(v_{2x}, v_{2y})$ represent motion vectors, whose precision is 1/n of the pixel precision, of three control points, w represents a width of the current picture block, and h represents a height of the current picture block.

With reference to any one of the first aspect, or the first to the ninth possible implementations of the first aspect, in a tenth possible implementation of the first aspect, the motion vectors of the W control points are predicted based on a motion vector, whose precision is 1/n of the pixel precision, of an encoded picture block or a decoded picture block that surrounds the current picture block.

With reference to any one of the first aspect, or the first to the tenth possible implementations of the first aspect, in an eleventh possible implementation of the first aspect, the picture prediction method is applied to a video encoding process or applied to a video decoding process.

A second aspect of the embodiments of the present disclosure provides a picture prediction apparatus, including:

a first determining unit, configured to determine motion vectors of W control points in a current picture block;

a calculation unit, configured to obtain, by means of calculation, motion vectors of P pixel units of the current picture block by using a motion model and the motion vectors of the W control points, where precision of the determined motion vectors of the W control points is 1/n of pixel precision, precision of the motion vector that is obtained by means of calculation and that is of each of the P pixel units is 1/N of the pixel precision, the P pixel units are some or all of pixel units of the current picture block, the motion vector of each of the P pixel units is used to determine a corresponding reference pixel unit, in a reference picture, of a corresponding pixel unit, W, n, and N are integers greater than 1, N is greater than n, and P is a positive integer; and an interpolation filtering unit, configured to perform interpolation filtering on a pixel of the corresponding reference pixel unit, in the reference picture, of each of the P pixel units by using an interpolation filter with a phase of Q, to obtain a predicted pixel value of each of the P pixel units, where Q is an integer greater than n.

With reference to the second aspect, in a first possible implementation of the second aspect, a value of N is a preset fixed value, and Q is less than or equal to N.

With reference to the second aspect or the first possible implementation of the second aspect, in a second possible implementation of the second aspect, a horizontal component or a vertical component of one of the motion vectors of the W control points is amplified N times in the motion model by using N, or a component difference between motion vectors of any two of the W control points is amplified N times in the motion model by using N.

With reference to the second aspect, the first possible implementation of the second aspect, or the second possible implementation of the second aspect, in a third possible implementation of the second aspect, the interpolation filtering unit is specifically configured to: obtain, by means of calculation, a phase of each of the P pixel units by using the motion vector of each of the P pixel units; determine, based on the phase of each pixel unit, the interpolation filter with the phase of Q that is corresponding to the corresponding pixel unit, where a filter coefficient used by the interpolation filter is corresponding to the phase; and perform interpolation filtering on the pixel of the corresponding reference pixel unit, in the reference picture, of each pixel unit by using the determined interpolation filter with the phase of Q that is corresponding to the corresponding pixel unit.

With reference to the third possible implementation of the second aspect, in a fourth possible implementation of the second aspect, in an aspect of obtaining, by means of calculation, a phase of each of the P pixel units by using the motion vector of each of the P pixel units, the interpolation filtering unit is specifically configured to obtain, by means of calculation, the phase of each of the P pixel units according to the following formula by using the motion vector of each of the P pixel units:

$$X'=\text{abs}(v_{Nx})\%N, \text{ or } X'=v_{Nx}\&((1\le M)-1);$$

$$Y'=\text{abs}(v_{Ny})\%N, \text{ or } Y'=v_{Ny}\&((1\le M)-1);$$

where

M is equal to $\log_2 N$ when N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

With reference to the third possible implementation of the second aspect or the fourth possible implementation of the second aspect, in a fifth possible implementation of the second aspect, the phase includes a horizontal phase and a vertical phase; and in an aspect of determining, based on the phase of each pixel unit, the interpolation filter with the phase of Q that is corresponding to the corresponding pixel unit, the interpolation filtering unit is specifically configured to: determine, based on the horizontal phase of each pixel unit, a horizontal interpolation filter with a phase of Q that is corresponding to the corresponding pixel unit; and determine, based on the vertical phase of each pixel unit, a vertical interpolation filter with a phase of Q that is corresponding to the corresponding pixel unit, where a filter coefficient used by the horizontal interpolation filter is corresponding to the horizontal phase, and a filter coefficient used by the vertical interpolation filter is corresponding to the vertical phase.

With reference to the fifth possible implementation of the second aspect, in a sixth possible implementation of the second aspect, in an aspect of performing interpolation filtering on the pixel of the corresponding reference pixel unit, in the reference picture, of each pixel unit by using the determined interpolation filter with the phase of Q that is corresponding to the corresponding pixel unit, the interpolation filtering unit is specifically configured to: perform horizontal interpolation filtering on a pixel of a corresponding reference pixel unit, in the reference picture, of a pixel unit i by using a determined horizontal interpolation filter with a phase of Q that is corresponding to the pixel unit i, to obtain a horizontal interpolation filtering result; and perform vertical interpolation filtering on the horizontal interpolation filtering result by using a determined vertical interpolation filter with a phase of Q that is corresponding to the pixel unit i, to obtain a predicted pixel value of the pixel unit i, where the pixel unit i is any one of the P pixel units; or the interpolation filtering unit is specifically configured to: perform vertical interpolation filtering on a pixel of a corresponding reference pixel unit, in the reference picture, of a pixel unit j by using a determined vertical interpolation filter with a phase of Q that is corresponding to the pixel unit j, to obtain a vertical interpolation filtering result; and perform horizontal interpolation filtering on the vertical interpolation filtering result by using a determined horizontal interpolation filter with a phase of Q that is corresponding to the pixel unit j, to obtain a predicted pixel value of the pixel unit j, where the pixel unit j is any one of the P pixel units.

With reference to any one of the second aspect, or the first to the sixth possible implementations of the second aspect, in a seventh possible implementation of the second aspect, the motion model is a translational motion model, an affine motion model, a rotational motion model, a zooming motion model, a parabolic motion model, a shearing motion model, a perspective motion model, or a bilinear motion model.

With reference to any one of the second aspect, or the first to the seventh possible implementations of the second aspect, in an eighth possible implementation of the second aspect, the motion model is represented as follows when W is equal to 2:

$$\begin{cases} v_{Nx} = \left(\frac{(v_{1x}-v_{0x})\times N}{L}x - \frac{(v_{1y}-v_{0y})\times N}{L}y + Nv_{0x}\right)/n \\ v_{Ny} = \left(\frac{(v_{1y}-v_{0y})\times N}{L}x + \frac{(v_{1x}-v_{0x})\times N}{L}y + Nv_{0y}\right)/n \end{cases}; \text{or}$$

$$\begin{cases} v_{Nx} = \frac{(v_{1x}-v_{0x})\times(N/n)}{L}x - \frac{(v_{1y}-v_{0y})\times(N/n)}{L}y + (N/n)v_{0x} \\ v_{Ny} = \frac{(v_{1y}-v_{0y})\times(N/n)}{L}x + \frac{(v_{1x}-v_{0x})\times(N/n)}{L}y + (N/n)v_{0y} \end{cases},$$

where

L represents a width or a height of the current picture block, $(v_{0x},v_{0y})$ and $(v_{1x},v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

With reference to any one of the second aspect, or the first to the seventh possible implementations of the second aspect, in a ninth possible implementation of the second aspect, the motion model is represented as follows when W is equal to 3:

$$\begin{cases} v_{Nx} = \left(\frac{(v_{1x}-v_{0x})\times N}{w}x + \frac{(v_{2x}-v_{0x})\times N}{h}y + Nv_{0x}\right)/n \\ v_{Ny} = \left(\frac{(v_{1y}-v_{0y})\times N}{w}x + \frac{(v_{2y}-v_{0y})\times N}{h}y + Nv_{0y}\right)/n \end{cases}; \text{or}$$

$$\begin{cases} v_{Nx} = \frac{(v_{1x}-v_{0x})\times(N/n)}{w}x + \frac{(v_{2x}-v_{0x})\times(N/n)}{h}y + (N/n)v_{0x} \\ v_{Ny} = \frac{(v_{1y}-v_{0y})\times(N/n)}{w}x + \frac{(v_{2y}-v_{0y})\times(N/n)}{h}y + (N/n)v_{0y} \end{cases},$$

where $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x},v_{0y})$, $(v_{1x},v_{1y})$, and $(v_{2x},v_{2y})$ represent motion vectors, whose precision is 1/n of the pixel precision, of three control points, w represents a width of the current picture block, and h represents a height of the current picture block.

With reference to any one of the second aspect, or the first to the ninth possible implementations of the second aspect, in a tenth possible implementation of the second aspect, the motion vectors of the W control points are predicted based on a motion vector, whose precision is 1/n of the pixel precision, of an encoded picture block or a decoded picture block that surrounds the current picture block.

With reference to any one of the second aspect, or the first to the tenth possible implementations of the second aspect, in an eleventh possible implementation of the second aspect, the picture prediction apparatus is applied to a video encoding apparatus or the picture prediction apparatus is applied to a video decoding apparatus.

An embodiment of the present disclosure further provides a picture prediction apparatus, including a processor and a memory. The picture prediction apparatus may further include, for example, a network interface. The memory is configured to store an instruction, the processor is configured to execute the instruction, and the network interface is configured to communicate, under control of the processor, with another device.

For example, the processor is configured to: determine motion vectors of W control points in a current picture block; obtain, by means of calculation, motion vectors of P pixel units of the current picture block by using a motion model and the motion vectors of the W control points, where precision of the determined motion vectors of the W control points is 1/n of pixel precision, precision of the motion vector that is obtained by means of calculation and that is of each of the P pixel units is 1/N of the pixel precision, the P pixel units are some or all of pixel units of the current picture block, the motion vector of each of the P pixel units is used to determine a corresponding reference pixel unit, in a reference picture, of a corresponding pixel unit, W, n, and N are integers greater than 1, N is greater than n, and P is a positive integer; and perform interpolation filtering on a pixel of the corresponding reference pixel unit, in the reference picture, of each of the P pixel units by using an interpolation filter with a phase of Q, to obtain a predicted pixel value of each of the P pixel units, where Q is an integer greater than n.

In addition, an embodiment of the present disclosure further provides a computer readable storage medium. The computer readable storage medium stores program code for picture prediction. The program code includes an instruction for executing a picture prediction method.

It can be learnt that, in the picture prediction method provided in the embodiments of the present disclosure, the motion vector, whose precision is 1/N of the pixel precision, of each pixel unit of the current picture block is obtained by means of calculation by using the motion model and the motion vectors, whose precision is 1/n of the pixel precision, of the W control points, where N is greater than n. In other words, the precision of the motion vector that is obtained by means of calculation and that is of each pixel unit of the current picture block is higher than the precision of the determined motion vectors of the W control points. The higher-precision motion vector is obtained first. Therefore, the higher-precision motion vector of each pixel unit of the current picture block is used to determine the corresponding reference pixel unit, in the reference picture, of each pixel unit of the current picture block, and interpolation filtering is performed on the pixel of the corresponding reference pixel unit, in the reference picture, of each pixel unit of the current picture block by using the interpolation filter with the phase of Q (Q is greater than n), to obtain the predicted pixel value of each pixel unit of the current picture block. It can be learnt that, the foregoing manner helps reduce a quantity of times of interpolation filtering required for obtaining, by means of prediction, the higher-precision predicted pixel value of the current picture block (for example, an intermediate process for obtaining a lower-precision predicted pixel value by performing lower-precision interpolation filtering may not be required), so as to reduce a quantity of intermediate caches and memory operations that are required for interpolation filtering during a picture prediction process, and reduce calculation complexity during the picture prediction process.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still obtain other drawings from these accompanying drawings without creative efforts.

FIG. 1-a and FIG. 1-b are schematic diagrams of several types of division of a picture block according to an embodiment of the present disclosure;

FIG. 2-a is a schematic flowchart of a picture prediction method according to an embodiment of the present disclosure;

FIG. 2-b is a schematic diagram of prediction of motion vectors of control points according to an embodiment of the present disclosure;

FIG. 3-a is a schematic flowchart of another picture prediction method according to an embodiment of the present disclosure;

FIG. 3-b is a schematic diagram of an integer-pixel location and a sub-pixel location according to an embodiment of the present disclosure;

DESCRIPTION OF EMBODIMENTS

Figure 4:
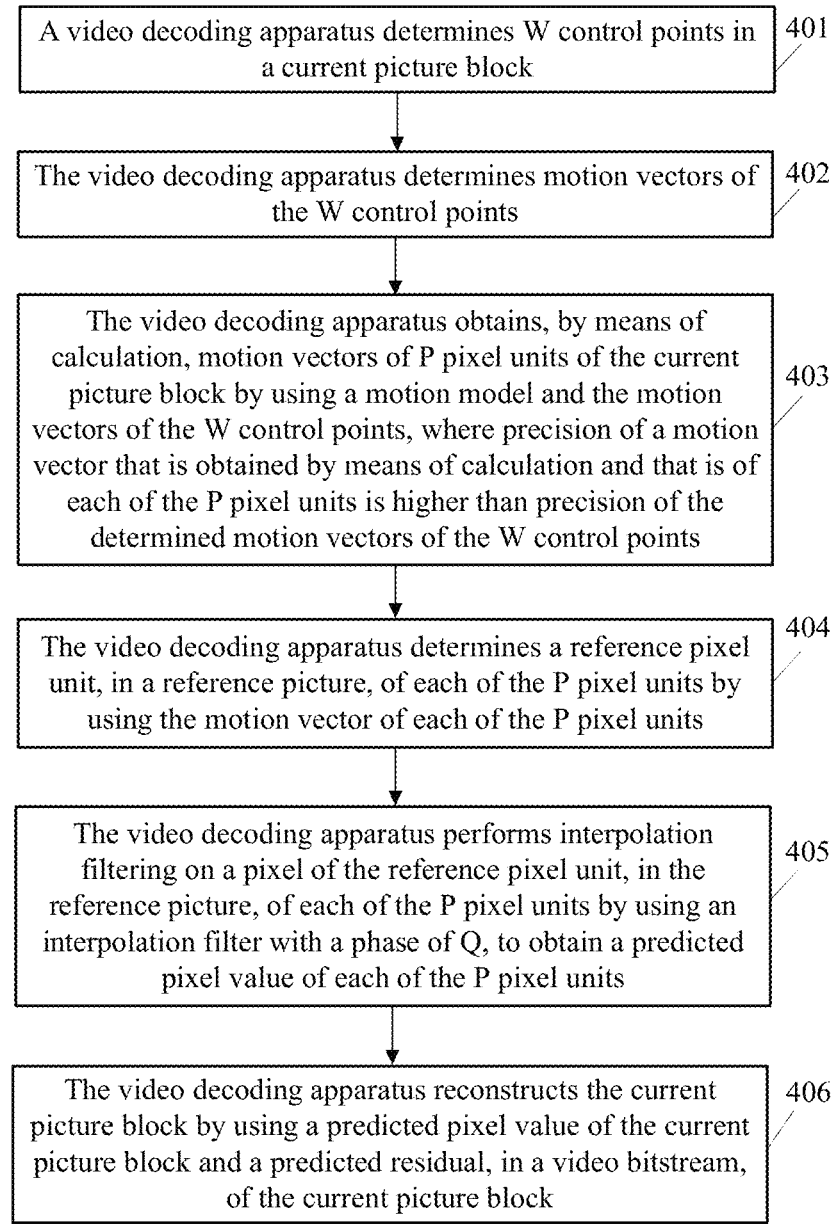
FIG. 4 is a schematic flowchart of another picture prediction method according to an embodiment of the present disclosure.

Embodiments of the present disclosure provide a picture prediction method and a related device, so as to reduce a quantity of intermediate caches and memory operations that are required for interpolation filtering during a picture prediction process, and reduce calculation complexity during the picture prediction process.

In the specification, claims, and accompanying drawings of the present disclosure, the terms "first", "second", "third", and so on are intended to distinguish between different objects but do not indicate a particular order. In addition, the terms "including", "comprising", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following first briefly describes some concepts that may be related to the embodiments of the present disclosure.

In most coding frameworks, a video sequence includes a series of pictures, a picture is further divided into slices, and a slice is further divided into blocks. Video coding is based on a unit of a block, and coding processing may start to be performed at a location of an upper left corner of a picture and then performed line by line from left to right and from top to bottom. In some new video coding standards, a concept of the block is further extended. In the H.264 standard, a macroblock (MB) is described, and the MB may be further divided into multiple prediction partitions that may be used for predictive coding. In the HEVC standard, basic concepts of a coding unit (CU), a prediction unit (PU), a transform unit (TU), and the like are used. Multiple types of units are obtained by means of function division, and are described by using a new tree-based structure. For example, the CU may be divided into smaller CUs according to a quad tree, and a smaller CU may further continue to be divided to form a quad tree structure. Tree structures of the PU and the TU are similar to that of the CU. The CU, the PU, and the TU all belong to the concept of the block in essence. Similar to a macroblock MB or a coding block, the CU is a basic unit for dividing and encoding a coding picture. The PU is a basic unit for predictive coding, and may be corresponding to a prediction partition. According to a division manner, the CU is further divided into multiple PUs. The TU is a basic unit for transforming a predicted residual, and may be corresponding to a transform block. In the High Efficiency Video Coding (English: high efficiency video coding, HEVC for short) standard, the CU, the PU, and the TU may be collectively referred to as a coding tree block (English: coding tree block, CTB for short), and the like.

In the HEVC standard, the coding unit may include four levels in size: 64×64, 32×32, 16×16, and 8×8. Each level of coding unit may be divided into prediction units of different sizes according to intra-frame prediction and inter-frame prediction. For example, as shown in FIG. 1-a and FIG. 1-b, FIG. 1-a shows a prediction unit division manner corresponding to intra-frame prediction, and FIG. 1-b shows several prediction unit division manners corresponding to inter-frame prediction.

During a development and evolution process of a video coding technology, experts in video coding figure out various methods to utilize spatial-temporal correlation between adjacent encoded/decoded blocks to improve coding efficiency. In the H.264/Advanced Video Coding (English: advanced video coding, AVC for short) standard, a skip mode (skip mode) and a direct mode (direct mode) become effective means to improve coding efficiency. In a case of a low bit rate, a quantity of blocks using the two coding modes accounts for more than a half of blocks in an entire coding sequence. When the skip mode is used, a motion vector of a current picture block may be obtained by means of derivation by using a surrounding motion vector provided that a skip mode tag is transferred in a bitstream, and a value of a reference block is directly used as a reconstruction value of the current picture block according to the motion vector. Alternatively, when the direct mode is used, an encoder may obtain, by means of derivation, a motion vector of a current picture block by using a surrounding motion vector, directly use a value of a reference block as a predicted value of the current picture block according to the motion vector, and perform predictive coding on the current picture block on an encoder side by using the predicted value. At present, some new coding means are used in the latest High Efficiency Video Coding (English: high efficiency video coding, HEVC for short) standard, to further improve video coding performance. A merge coding mode and an advanced motion vector prediction (AMVP) mode are two important interframe prediction means. In the merge coding mode, motion information (including a motion vector (MV), a prediction direction, a reference-frame index, and the like) of a coded block that surrounds a current coding block is used to form a set of candidate motion information. Candidate motion information with highest coding efficiency may be selected, by means of comparison, as motion information of the current coding block. Predictive coding is performed on the current coding block by using a predicted value, found in a reference frame, of the current coding block. In addition, an index value indexing a specific surrounding coded block from which motion information is selected may be written into a bitstream. When the advanced motion vector prediction mode is used, a motion vector of a surrounding coded block is used as a predicted value of a motion vector of a current coding block, a motion vector with highest coding efficiency may be selected to predict the motion vector of the current coding block, and an index value indicating selection of a specific surrounding motion vector may be written into a video bitstream.

The following continues to describe the technical solutions of the embodiments of the present disclosure.

The following first describes the picture prediction method provided in the embodiments of the present disclosure. The picture prediction method provided in the embodiments of the present disclosure is executed by a video encoding apparatus or a video decoding apparatus. The video encoding apparatus or the video decoding apparatus may be any apparatus that needs to output or store a video, for example, a notebook computer, a tablet computer, a personal computer, a mobile phone, a video server, or another device.

In an embodiment of the picture prediction method provided in the present disclosure, the picture prediction method may include: determining motion vectors of W control points in a current picture block; obtaining, by means of calculation, motion vectors of P pixel units of the current picture block by using a motion model and the motion vectors of the W control points, where precision of the determined motion vectors of the W control points is 1/n of pixel precision, precision of the motion vector that is obtained by means of calculation and that is of each of the P pixel units is 1/N of the pixel precision, the P pixel units are some or all of pixel units of the current picture block, the motion vector of each of the P pixel units is used to determine a corresponding reference pixel unit, in a reference picture, of a corresponding pixel unit, W, n, and N are integers greater than 1, N is greater than n, and P is a positive integer; and performing interpolation filtering on a pixel of the corresponding reference pixel unit, in the reference picture, of each of the P pixel units by using an interpolation filter with a phase of Q, to obtain a predicted pixel value of each of the P pixel units, where Q is an integer greater than n.

Referring to FIG. 2-*a*, FIG. 2-*a* is a schematic flowchart of a picture prediction method according to an embodiment of the present disclosure. In an example shown in FIG. 2-*a*, the picture prediction method provided in this embodiment of the present disclosure may include the following steps.

201. Determine motion vectors of W control points in a current picture block.

202. Obtain, by means of calculation, motion vectors of P pixel units of the current picture block by using a motion model and the motion vectors of the W control points.

The P pixel units are some or all of pixel units of the current picture block.

A motion vector of each of the P pixel units is used to determine a corresponding reference pixel unit, in a reference picture, of a corresponding pixel unit. Therefore, the motion vector of each of the P pixel units may be used to determine the corresponding reference pixel unit, in the reference picture, of the corresponding pixel unit.

Precision of the determined motion vectors of the W control points is 1/n of pixel precision.

Precision of the motion vector that is obtained by means of calculation and that is of each of the P pixel units is 1/N of the pixel precision.

W, n, and N are integers greater than 1.

N is greater than n. P is a positive integer.

Because N is greater than n, the precision of the motion vector that is obtained by means of calculation and that is of each of the P pixel units is higher than the precision of the determined motion vectors of the W control points. That is, the higher-precision motion vectors of the P pixel units of the current picture block are obtained.

In some possible implementations of the present disclosure, the motion vectors of the W control points are predicted based on a motion vector, whose precision is 1/n of the pixel precision, of an encoded picture block or a decoded picture block that surrounds the current picture block.

In an example shown in FIG. 2-*b*, the W control points include a control point LT, a control point RT, and a control point LB. A motion vector of the control point LT may be predicted based on motion vectors, whose precision is 1/n of the pixel precision, of picture blocks A, B, and C. A motion vector of the control point RT may be predicted based on motion vectors, whose precision is 1/n of the pixel precision, of picture blocks D and E. A motion vector of the control point LB may be predicted based on motion vectors, whose precision is 1/n of the pixel precision, of picture blocks F and G.

In some possible implementations of the present disclosure, when the motion vectors of the W control points are based on predicted values, precision of the predicted values is also 1/n of the pixel precision, and differences between the motion vectors, whose precision is 1/n of the pixel precision, of the control points and the corresponding predicted values may be written into a bitstream.

In some possible implementations of the present disclosure, the motion model may be, for example, a translational motion model, an affine motion model, a rotational motion model, a parabolic motion model, a shearing motion model, a zooming motion model, a perspective motion model, or a bilinear motion model.

203. Perform interpolation filtering on a pixel of a reference pixel unit, in a reference picture, of each of the P pixel units by using an interpolation filter with a phase of Q, to obtain a predicted pixel value of each of the P pixel units.

Q is an integer greater than n.

In some possible implementations of the present disclosure, a value of N may be a preset fixed value, and Q may be less than or equal to N. When the value of N may be a preset fixed value, it indicates that the precision of the motion vectors, obtained by means of calculation by using the motion model and the motion vectors of the W control points, of the P pixel units of the current picture block is unnecessarily related to a size of the current picture block. In other words, for example, based on the solution of this embodiment, the predicted pixel value with preset fixed precision can be obtained without an intermediate process for obtaining a lower-precision predicted pixel value by performing lower-precision interpolation filtering.

For example, W may be equal to 2, 3, 4, 5, 6, 8, or another value.

For example, P may be equal to 1, 2, 3, 4, 5, 6, 8, 10, 15, 16, 21, 32, 64, or another value.

For example, Q may be equal to 128, 9, 18, 24, 256, 8, 10, 15, 16, 21, 32, 64, or another value.

For example, N may be equal to 128, 9, 18, 24, 256, 8, 10, 15, 16, 21, 32, 64, or another value.

For example, n may be equal to 8, 2, 4, or another value.

In some possible implementations of the present disclosure, N may be an integral power of 2, or certainly, N may be another positive integer.

A pixel unit in the embodiments of the present disclosure may include one or more pixels. For example, the pixel unit may be a 2×2 pixel block, a 2×1 pixel block, a 2×1 pixel block, a 4×4 pixel block, or a 4×2 pixel block.

A control point in the embodiments of the present disclosure may include one or more pixels. For example, the control point may be a 2×2 pixel block, a 2×1 pixel block, a 2×1 pixel block, a 4×4 pixel block, or a 4×2 pixel block.

It can be learnt from the foregoing that, in the picture prediction method provided in this embodiment, the motion vector, whose precision is 1/N of the pixel precision, of each pixel unit of the current picture block is obtained by means of calculation by using the motion model and the motion vectors, whose precision is 1/n of the pixel precision, of the W control points, where N is greater than n. In other words, the precision of the motion vector that is obtained by means of calculation and that is of each pixel unit of the current picture block is higher than the precision of the determined motion vectors of the W control points. The higher-precision motion vector is obtained first. Therefore, the higher-precision motion vector of each pixel unit of the current picture block is used to determine the corresponding reference pixel unit, in the reference picture, of each pixel unit of the current picture block, and interpolation filtering is performed on the pixel of the corresponding reference pixel unit, in the reference picture, of each pixel unit of the current picture block by using the interpolation filter with the phase of Q (Q is greater than n), to obtain the predicted pixel value of each pixel unit of the current picture block. It can be learnt that, the foregoing manner helps reduce a quantity of interpolation filtering required for obtaining, by means of prediction, the higher-precision predicted pixel value of the current picture block (for example, an intermediate process for obtaining the lower-precision predicted pixel value by performing lower-precision interpolation filtering may not be required), so as to reduce a quantity of intermediate caches and memory operations that are required for interpolation filtering during a picture prediction process, and reduce calculation complexity during the picture prediction process.

In some possible implementations of the present disclosure, a horizontal component or a vertical component of one of the motion vectors of the W control points is amplified N times in the motion model by using N, or a component difference between motion vectors of any two of the W control points is amplified N times in the motion model by using N.

For example, in some possible implementations of the present disclosure, the motion model may be represented as follows when W is equal to 2:

$$\begin{cases} v_{Nx} = \left( \frac{(v_{1x} - v_{0x}) \times N}{L} x - \frac{(v_{1y} - v_{0y}) \times N}{L} y + Nv_{0x} \right) / n \\ v_{Ny} = \left( \frac{(v_{1y} - v_{0y}) \times N}{L} x + \frac{(v_{1x} - v_{0x}) \times N}{L} y + Nv_{0y} \right) / n \end{cases} ; \text{or}$$

$$\begin{cases} v_{Nx} = \frac{(v_{1x} - v_{0x}) \times (N/n)}{L} x - \frac{(v_{1y} - v_{0y}) \times (N/n)}{L} y + (N/n)v_{0x} \\ v_{Ny} = \frac{(v_{1y} - v_{0y}) \times (N/n)}{L} x + \frac{(v_{1x} - v_{0x}) \times (N/n)}{L} y + (N/n)v_{0y} \end{cases},$$

where

L represents a width or a height of the current picture block, $(v_{0x}, v_{0y})$ and $(v_{1x}, v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

For another example, in some possible implementations of the present disclosure, the motion model may be represented as follows when W is equal to 3:

$$\begin{cases} v_{Nx} = \left( \frac{(v_{1x} - v_{0x}) \times N}{w} x + \frac{(v_{2x} - v_{0x}) \times N}{h} y + Nv_{0x} \right) / n \\ v_{Ny} = \left( \frac{(v_{1y} - v_{0y}) \times N}{w} x + \frac{(v_{2y} - v_{0y}) \times N}{h} y + Nv_{0y} \right) / n \end{cases} ; \text{or}$$

$$\begin{cases} v_{Nx} = \frac{(v_{1x} - v_{0x}) \times (N/n)}{w} x + \frac{(v_{2x} - v_{0x}) \times (N/n)}{h} y + (N/n)v_{0x} \\ v_{Ny} = \frac{(v_{1y} - v_{0y}) \times (N/n)}{w} x + \frac{(v_{2y} - v_{0y}) \times (N/n)}{h} y + (N/n)v_{0y} \end{cases},$$

where $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x}, v_{0y})$, $(v_{1x}, v_{1y})$, and $(v_{2x}, v_{2y})$ represent motion vectors, whose precision is 1/n of the pixel precision, of three control points, w represents a width of the current picture block, and h represents a height of the current picture block.

The foregoing examples are described by using the affine motion model. When a translational motion model, a rotational motion model, a shearing motion model, a zooming motion model, a perspective motion model, a parabolic motion model, a bilinear motion model, or the like is used, reference may be made to the foregoing examples. Details are not described herein again.

For example, a general representation form of a motion model may be as follows:

$(v_{Nx}, v_{Ny}) = f(\{(v_{ix}, v_{iy}) | i = 0, 1, \ldots, M\}, N, (x, y)),$ where precision of a motion vector $(v_{0x}, v_{0y})$ of a control point is 1/n of pixel precision, and to balance an effect and bit overheads, a value of n may be set to 4; N may represent a preset phase of a filter; and (x, y) represents coordinate values of any pixel unit in a picture block; and $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the determining the corresponding reference pixel unit, in the reference picture, of each of the P pixel units by using the motion vector of each of the P pixel units may include: obtaining, by means of calculation, an integer-pixel location of each of the P pixel units by using the motion vector of each of the P pixel units; and searching, by using the motion vector of each of the P pixel units, the reference picture for a reference pixel unit corresponding to the integer-pixel location of each of the P pixel units, where the reference pixel unit that is corresponding to the integer-pixel location of each of the P pixel units and that is found in the reference picture is the reference pixel unit, in the reference picture, of each of the P pixel units.

Specifically, for example, an integer-pixel location of a pixel unit i may be obtained by means of calculation by using a motion vector of the pixel unit i of the P pixel units, and the reference picture may be searched, by using the motion vector of the pixel unit i, for a reference pixel unit corresponding to the integer-pixel location of the pixel unit i, where the reference pixel unit that is corresponding to the integer-pixel location of the pixel unit i and that is found in the reference picture is a reference pixel unit, in the reference picture, of the pixel unit i. The pixel unit i may be any one of the P pixel units. For example, the corresponding reference pixel unit, in the reference picture, of each of the P pixel units may be determined according to a manner similar to that of determining the reference pixel unit, in the reference picture, of the pixel unit i.

In some possible implementations of the present disclosure, the obtaining, by means of calculation, an integer-pixel location of each of the P pixel units by using the motion vector of each of the P pixel units includes:

obtaining, by means of calculation, the integer-pixel location of each of the P pixel units according to the following formula by using the motion vector of each of the P pixel units:

$$x\text{Int}=[v_{Nx}/N], \text{ or } x\text{Int}=v_{Nx}\geq M;$$

$$y\text{Int}=[v_{Ny}/N], \text{ or } y\text{Int}=v_{Ny}\geq M;$$

where

M is equal to $\log_2 N$ when N is an integral power of 2, (xInt, yInt) represents integer-pixel location coordinates of a pixel unit with coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

In some possible implementations of the present disclosure, the performing interpolation filtering on a pixel of the corresponding reference pixel unit, in the reference picture, of each of the P pixel units by using an interpolation filter with a phase of Q includes:

obtaining, by means of calculation, a phase of each of the P pixel units by using the motion vector of each of the P pixel units; determining, based on the phase of each pixel unit, the interpolation filter with the phase of Q that is corresponding to the corresponding pixel unit, where a filter coefficient used by the interpolation filter is corresponding to the phase; and performing interpolation filtering on the pixel of the corresponding reference pixel unit, in the reference picture, of each pixel unit by using the determined interpolation filter with the phase of Q that is corresponding to the corresponding pixel unit.

Specifically, for example, a phase of the pixel unit i may be obtained by means of calculation by using the motion vector of the pixel unit i of the P pixel units; an interpolation filter with a phase of Q that is corresponding to the pixel unit i may be determined based on the phase of the pixel unit i, where a filter coefficient used by the interpolation filter is corresponding to the phase; and interpolation filtering may be performed on a pixel of the corresponding reference pixel unit, in the reference picture, of the pixel unit i by using the determined interpolation filter with the phase of Q that is corresponding to the pixel unit i. The pixel unit i may be any one of the P pixel units. For example, interpolation filtering may be performed on each of the P pixel units according to a manner similar to that of performing interpolation filtering on the pixel unit i.

In some possible implementations of the present disclosure, the obtaining, by means of calculation, a phase of each of the P pixel units by using the motion vector of each of the P pixel units includes: obtaining, by means of calculation, the phase of each of the P pixel units according to the following formula by using the motion vector of each of the P pixel units:

$$X'=\text{abs}(v_{Nx})\%N, \text{ or } X'=v_{Nx}\&((1\leq M)-1).$$

$$Y'=\text{abs}(v_{Ny})\%N, \text{ or } Y'=v_{Ny}\&((1\leq M)-1),$$

where

M is equal to $\log_2 N$ when N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the phase includes a horizontal phase and a vertical phase; and the determining, based on the phase of each pixel unit, the interpolation filter with the phase of Q that is corresponding to the pixel unit includes: determining, based on the horizontal phase of each pixel unit, a horizontal interpolation filter with a phase of Q that is corresponding to the corresponding pixel unit; and determining, based on the vertical phase of each pixel unit, a vertical interpolation filter with a phase of Q that is corresponding to the corresponding pixel unit, where a filter coefficient used by the horizontal interpolation filter is corresponding to the horizontal phase, and a filter coefficient used by the vertical interpolation filter is corresponding to the vertical phase.

Specifically, for example, a horizontal interpolation filter with a phase of Q that is corresponding to the pixel unit i may be determined based on a horizontal phase of the pixel unit i, and a vertical interpolation filter with a phase of Q that is corresponding to the pixel unit i may be determined based on a vertical phase of the pixel unit i, where a filter coefficient used by the horizontal interpolation filter is corresponding to the horizontal phase of the pixel unit i, and a filter coefficient used by the vertical interpolation filter is corresponding to the vertical phase of the pixel unit i. The pixel unit i may be any one of the P pixel units. For example, the interpolation filter with the phase of Q that is corresponding to each of the P pixel units may be determined according to a manner similar to that of determining the interpolation filter with the phase of Q that is corresponding to the pixel unit i.

Optionally, in some possible implementations of the present disclosure, the performing interpolation filtering on the pixel of the corresponding reference pixel unit, in the reference picture, of each pixel unit by using the determined interpolation filter with the phase of Q that is corresponding to the pixel unit includes:

performing horizontal interpolation filtering on the pixel of the corresponding reference pixel unit, in the reference picture, of the pixel unit i by using the determined horizontal interpolation filter with the phase of Q that is corresponding to the pixel unit i, to obtain a horizontal interpolation filtering result; and performing vertical interpolation filtering on the horizontal interpolation filtering result by using the determined vertical interpolation filter with the phase of Q that is corresponding to the pixel unit i, to obtain a predicted pixel value of the pixel unit i, where the pixel unit i is any one of the P pixel units; or performing vertical interpolation filtering on a pixel of a corresponding reference pixel unit, in the reference picture, of a pixel unit j by using a determined vertical interpolation filter with a phase of Q that is corresponding to the pixel unit j, to obtain a vertical interpolation filtering result; and performing horizontal interpolation filtering on the vertical interpolation filtering result by using a determined horizontal interpolation filter with a phase of Q that is corresponding to the pixel unit j, to obtain a predicted pixel value of the pixel unit j, where the pixel unit j is any one of the P pixel units.

In addition, if a pixel unit has only one phase (that is, has only a horizontal phase or a vertical phase), interpolation filtering needs to be performed on a pixel of a reference pixel unit of the pixel unit only once, to obtain a predicted pixel value of the pixel unit.

Optionally, in some possible implementations of the present disclosure, the determining motion vectors of W control points in a current picture block includes:

determining the W control points in the current picture block, and determining a candidate motion information unit set corresponding to each of the W control points, where the candidate motion information unit set corresponding to each control point includes at least one candidate motion information unit;

determining a combined motion information unit set e including W motion information units, where each motion information unit in the combined motion information unit set e is selected from at least some motion information units in the candidate motion information unit set corresponding to each of the W control points, and each combined motion information unit in the combined motion information unit set e includes a motion vector; and performing prediction or motion estimation on W motion vectors in the combined motion information unit set e to obtain the motion vectors of the W control points, or using W motion vectors included in the combined motion information unit set e as the motion vectors of the W control points.

In some possible implementations of the present disclosure, precision of each motion vector in the candidate motion information unit set may be 1/n of the pixel precision.

The picture prediction method may be applied to a video encoding process, or the picture prediction method may be applied to a video decoding process.

To better understand the technical solutions of the embodiments of the present disclosure, the following provides descriptions from perspectives of an encoder side and a decoder side by using examples.

The following first describes a solution from a perspective of an encoder side.

Referring to FIG. 3-$a$, FIG. 3-$a$ is a schematic flowchart of another picture prediction method according to another embodiment of the present disclosure. In an example shown in FIG. 3-$a$, the another picture prediction method provided in the another embodiment of the present disclosure may include the following steps.

301. A video encoding apparatus determines W control points in a current picture block.

302. The video encoding apparatus determines motion vectors of the W control points.

The determining, by the video encoding apparatus, motion vectors of the W control points may include: determining a candidate motion information unit set corresponding to each of the W control points, where the candidate motion information unit corresponding to each control point set includes at least one candidate motion information unit; determining a combined motion information unit set e including W motion information units, where each motion information unit in the combined motion information unit set e is selected from at least some motion information units in the candidate motion information unit set corresponding to each of the W control points, and each combined motion information unit in the combined motion information unit set e includes a motion vector; and performing prediction or motion estimation on W motion vectors in the combined motion information unit set e to obtain the motion vectors of the W control points, or using W motion vectors included in the combined motion information unit set e as the motion vectors of the W control points.

In some possible implementations of the present disclosure, precision of each motion vector in the candidate motion information unit set may be 1/n of pixel precision.

303. The video encoding apparatus obtains, by means of calculation, motion vectors of P pixel units of the current picture block by using a motion model and the motion vectors of the W control points.

P is a positive integer, and W and N are integers greater than 1.

The P pixel units are some or all of pixel units of the current picture block.

A motion vector of each of the P pixel units is used to determine a corresponding reference pixel unit, in a reference picture, of a corresponding pixel unit. Therefore, the motion vector of each of the P pixel units may be used to determine the corresponding reference pixel unit, in the reference picture, of the corresponding pixel unit.

Precision of the determined motion vectors of the W control points is 1/n of the pixel precision.

Precision of the motion vector that is obtained by means of calculation and that is of each of the P pixel units is 1/N of the pixel precision.

W, n, and N are integers greater than 1.

N is greater than n. P is a positive integer.

Because N is greater than n, the precision of the motion vector that is obtained by means of calculation and that is of each of the P pixel units is higher than the precision of the determined motion vectors of the W control points. That is, the higher-precision motion vectors of the P pixel units of the current picture block are obtained.

In some possible implementations of the present disclosure, the motion vectors of the W control points are predicted based on a motion vector, whose precision is 1/n of the pixel precision, of an encoded picture block or a decoded picture block that surrounds the current picture block.

In some possible implementations of the present disclosure, when the motion vectors of the W control points are based on predicted values, precision of the predicted values is also 1/n of the pixel precision, and differences between the motion vectors, whose precision is 1/n of the pixel precision, of the control points and the corresponding predicted values may be written into a bitstream. Correspondingly, the motion vectors, whose precision is 1/n of the pixel precision, of the W control points may be obtained, by means of prediction, on a decoder side by using the predicted difference between the W motion vectors and the predicted motion vector and by using the motion vector, whose precision is 1/n of the pixel precision, of the decoded picture block that surrounds the current picture block, where the predicted difference is obtained from the bitstream.

In some possible implementations of the present disclosure, the motion model may be, for example, a translational motion model, an affine motion model, a rotational motion model, a parabolic motion model, a shearing motion model, a zooming motion model, a perspective motion model, or a bilinear motion model.

For example, in some possible implementations of the present disclosure, the motion model may be represented as follows when W is equal to 2:

$$\begin{cases} v_{Nx} = \left( \frac{(v_{1x} - v_{0x}) \times N}{L} x - \frac{(v_{1y} - v_{0y}) \times N}{L} y + Nv_{0x} \right) / n \\ v_{Ny} = \left( \frac{(v_{1y} - v_{0y}) \times N}{L} x + \frac{(v_{1x} - v_{0x}) \times N}{L} y + Nv_{0y} \right) / n \end{cases} ; \text{ or}$$

$$\begin{cases} v_{Nx} = \frac{(v_{1x} - v_{0x}) \times (N/n)}{L} x - \frac{(v_{1y} - v_{0y}) \times (N/n)}{L} y + (N/n)v_{0x} \\ v_{Ny} = \frac{(v_{1y} - v_{0y}) \times (N/n)}{L} x + \frac{(v_{1x} - v_{0x}) \times (N/n)}{L} y + (N/n)v_{0y} \end{cases} ,$$

where

L represents a width or a height of the current picture block, $(v_{0x}, v_{0y})$ and $(v_{1x}, v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

For another example, in some possible implementations of the present disclosure, the motion model may be represented as follows when W is equal to 3:

$$\begin{cases} v_{Nx} = \left( \frac{(v_{1x} - v_{0x}) \times N}{w} x + \frac{(v_{2x} - v_{0x}) \times N}{h} y + Nv_{0x} \right) / n \\ v_{Ny} = \left( \frac{(v_{1y} - v_{0y}) \times N}{w} x + \frac{(v_{2y} - v_{0y}) \times N}{h} y + Nv_{0y} \right) / n \end{cases} ; \text{ or}$$

-continued $$\begin{cases} v_{Nx} = \frac{(v_{1x} - v_{0x}) \times (N/n)}{w} x + \frac{(v_{2x} - v_{0x}) \times (N/n)}{h} y + (N/n)v_{0x} \\ v_{Ny} = \frac{(v_{1y} - v_{0y}) \times (N/n)}{w} x + \frac{(v_{2y} - v_{0y}) \times (N/n)}{h} y + (N/n)v_{0y} \end{cases} ,$$

where $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x}, v_{0y})$, $(v_{1x}, v_{1y})$, and $(v_{2x}, v_{2y})$ represent motion vectors, whose precision is 1/n of the pixel precision, of three control points, w represents a width of the current picture block, and h represents a height of the current picture block.

The foregoing examples are described by using the affine motion model. When a translational motion model, a rotational motion model, a shearing motion model, a zooming motion model, a perspective motion model, a parabolic motion model, a bilinear motion model, or the like is used, reference may be made to the foregoing examples. Details are not described herein again.

304. The video encoding apparatus determines a corresponding reference pixel unit, in a reference picture, of each of the P pixel units by using a motion vector of each of the P pixel units.

Optionally, in some possible implementations of the present disclosure, the determining a corresponding reference pixel unit, in a reference picture, of each of the P pixel units by using a motion vector of each of the P pixel units may include: obtaining, by means of calculation, an integer-pixel location of each of the P pixel units by using the motion vector of each of the P pixel units; and searching, by using the motion vector of each of the P pixel units, the reference picture for a reference pixel unit corresponding to the integer-pixel location of each of the P pixel units, where the reference pixel unit that is corresponding to the integer-pixel location of each of the P pixel units and that is found in the reference picture is the reference pixel unit, in the reference picture, of each of the P pixel units.

Specifically, for example, an integer-pixel location of a pixel unit i may be obtained by means of calculation by using a motion vector of the pixel unit i of the P pixel units, and the reference picture may be searched, by using the motion vector of the pixel unit i, for a reference pixel unit corresponding to the integer-pixel location of the pixel unit i, where the reference pixel unit that is corresponding to the integer-pixel location of the pixel unit i and that is found in the reference picture is a reference pixel unit, in the reference picture, of the pixel unit i. The pixel unit i may be any one of the P pixel units. For example, the corresponding reference pixel unit, in the reference picture, of each of the P pixel units may be determined according to a manner similar to that of determining the reference pixel unit, in the reference picture, of the pixel unit i.

In some possible implementations of the present disclosure, the obtaining, by means of calculation, an integer-pixel location of each of the P pixel units by using the motion vector of each of the P pixel units includes:

obtaining, by means of calculation, the integer-pixel location of each of the P pixel units according to the following formula by using the motion vector of each of the P pixel units:

$x\text{Int} = [v_{Nx}/N]$, or $x\text{Int} = v_{Nx} \geq M$.

$y\text{Int} = [v_{Ny}/N]$, or $y\text{Int} = v_{Ny} \geq M$.

where

M is equal to $\log_2 N$ when N is an integral power of 2, (xInt, yInt) represents integer-pixel location coordinates of a pixel unit with coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

For example, referring to FIG. 3-b, square boxes in FIG. 3-b represent pixels at integer-pixel locations adjacent to a current location, and triangles represent sub-pixels.

305. The video encoding apparatus performs interpolation filtering on a pixel of the corresponding reference pixel unit, in the reference picture, of each of the P pixel units by using an interpolation filter with a phase of Q, to obtain a predicted pixel value of each of the P pixel units.

Q is an integer greater than n.

In some possible implementations of the present disclosure, a value of N may be a preset fixed value, and Q may be greater than or equal to N. When the value of N may be a preset fixed value, it indicates that the precision of the motion vectors, obtained by means of calculation by using the motion model and the motion vectors of the W control points, of the P pixel units of the current picture block is unnecessarily related to a size of the current picture block. In other words, for example, based on the solution of this embodiment, the predicted pixel value with preset fixed precision can be obtained without an intermediate process for obtaining a lower-precision predicted pixel value by performing lower-precision interpolation filtering.

For example, W may be equal to 2, 3, 4, 5, 6, 8, or another value.

For example, P may be equal to 1, 2, 3, 4, 5, 6, 8, 10, 15, 16, 21, 32, 64, or another value.

For example, Q may be equal to 128, 9, 18, 24, 256, 8, 10, 15, 16, 21, 32, 64, or another value.

For example, N may be equal to 128, 9, 18, 24, 256, 8, 10, 15, 16, 21, 32, 64, or another value.

For example, n may be equal to 8, 2, 4, or another value.

In some possible implementations of the present disclosure, N may be an integral power of 2, or certainly, N may be another positive integer.

In some possible implementations of the present disclosure, the performing interpolation filtering on a pixel of the corresponding reference pixel unit, in the reference picture, of each of the P pixel units by using an interpolation filter with a phase of Q includes:

obtaining, by means of calculation, a phase of each of the P pixel units by using the motion vector of each of the P pixel units; determining, based on the phase of each pixel unit, the interpolation filter with the phase of Q that is corresponding to the corresponding pixel unit, where a filter coefficient used by the interpolation filter is corresponding to the phase; and performing interpolation filtering on the pixel of the corresponding reference pixel unit, in the reference picture, of each pixel unit by using the determined interpolation filter with the phase of Q that is corresponding to the corresponding pixel unit.

Specifically, for example, a phase of the pixel unit i may be obtained by means of calculation by using the motion vector of the pixel unit i of the P pixel units; an interpolation filter with a phase of Q that is corresponding to the pixel unit i may be determined based on the phase of the pixel unit i, where a filter coefficient used by the interpolation filter is corresponding to the phase; and interpolation filtering may be performed on a pixel of the corresponding reference pixel unit, in the reference picture, of the pixel unit i by using the determined interpolation filter with the phase of Q that is corresponding to the pixel unit i. The pixel unit i may be any one of the P pixel units. For example, interpolation filtering may be performed on each of the P pixel units according to a manner similar to that of performing interpolation filtering on the pixel unit i.

In some possible implementations of the present disclosure, the obtaining, by means of calculation, a phase of each of the P pixel units by using the motion vector of each of the P pixel units includes: obtaining, by means of calculation, the phase of each of the P pixel units according to the following formula by using the motion vector of each of the P pixel units:

$$X' = \text{abs}(v_{Nx})\%N, \text{ or } X' = v_{Nx}\&((1\ll M)-1);$$

$$Y' = \text{abs}(v_{Ny})\%N, \text{ or } Y' = v_{Ny}\&((1\ll M)-1);$$

where

M is equal to $\log_2 N$ when N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the phase includes a horizontal phase and a vertical phase; and the determining, based on the phase of each pixel unit, the interpolation filter with the phase of Q that is corresponding to the pixel unit includes: determining, based on the horizontal phase of each pixel unit, a horizontal interpolation filter with a phase of Q that is corresponding to the corresponding pixel unit; and determining, based on the vertical phase of each pixel unit, a vertical interpolation filter with a phase of Q that is corresponding to the corresponding pixel unit, where a filter coefficient used by the horizontal interpolation filter is corresponding to the horizontal phase, and a filter coefficient used by the vertical interpolation filter is corresponding to the vertical phase.

Specifically, for example, a horizontal interpolation filter with a phase of Q that is corresponding to the pixel unit i may be determined based on a horizontal phase of the pixel unit i, and a vertical interpolation filter with a phase of Q that is corresponding to the pixel unit i may be determined based on a vertical phase of the pixel unit i, where a filter coefficient used by the horizontal interpolation filter is corresponding to the horizontal phase of the pixel unit i, and a filter coefficient used by the vertical interpolation filter is corresponding to the vertical phase of the pixel unit i. The pixel unit i may be any one of the P pixel units. For example, the interpolation filter with the phase of Q that is corresponding to each of the P pixel units may be determined according to a manner similar to that of determining the interpolation filter with the phase of Q that is corresponding to the pixel unit i.

Optionally, in some possible implementations of the present disclosure, the performing interpolation filtering on the pixel of the corresponding reference pixel unit, in the reference picture, of each pixel unit by using the determined interpolation filter with the phase of Q that is corresponding to the pixel unit includes:

performing horizontal interpolation filtering on the pixel of the corresponding reference pixel unit, in the reference picture, of the pixel unit i by using the determined horizontal interpolation filter with the phase of Q that is corresponding to the pixel unit i, to obtain a horizontal interpolation filtering result; and performing vertical interpolation filtering on the horizontal interpolation filtering result by using the determined vertical interpolation filter with the phase of Q that is corresponding to the pixel unit i, to obtain a predicted pixel value of the pixel unit i, where the pixel unit i is any one of the P pixel units; or performing vertical interpolation filtering on a pixel of a corresponding reference pixel unit, in the reference picture, of a pixel unit j by using a determined vertical interpolation filter with a phase of Q that is corresponding to the pixel unit j, to obtain a vertical interpolation filtering result; and performing horizontal interpolation filtering on the vertical interpolation filtering result by using a determined horizontal interpolation filter with a phase of Q that is corresponding to the pixel unit j, to obtain a predicted pixel value of the pixel unit j, where the pixel unit j is any one of the P pixel units.

In addition, if a pixel unit has only one phase (that is, has only a horizontal phase or a vertical phase), interpolation filtering needs to be performed on a pixel of a reference pixel unit of the pixel unit only once, to obtain a predicted pixel value of the pixel unit.

306. The video encoding apparatus may obtain a predicted residual of the current picture block by using original pixel values of the P pixel units and predicted pixel values of the P pixel units of the current picture block, and the video encoding apparatus may write the predicted residual of the current picture block into a video bitstream.

It can be learnt from the foregoing that, in the solution of this embodiment, the video encoding apparatus obtains, by means of calculation, the motion vector, whose precision is 1/N of the pixel precision, of each pixel unit of the current picture block by using the motion model and the motion vectors, whose precision is 1/n of the pixel precision, of the W control points, where N is greater than n. In other words, the precision of the motion vector that is obtained by means of calculation and that is of each pixel unit of the current picture block is higher than the precision of the determined motion vectors of the W control points. The higher-precision motion vector is obtained first. Therefore, the higher-precision motion vector of each pixel unit of the current picture block is used to determine the corresponding reference pixel unit, in the reference picture, of each pixel unit of the current picture block, and interpolation filtering is performed on the pixel of the corresponding reference pixel unit, in the reference picture, of each pixel unit of the current picture block by using the interpolation filter with the phase of Q (Q is greater than n), to obtain the predicted pixel value of each pixel unit of the current picture block. It can be learnt that, the foregoing manner helps reduce a quantity of times of interpolation filtering required for obtaining, by means of prediction, the higher-precision predicted pixel value of the current picture block (for example, an intermediate process for obtaining the lower-precision predicted pixel value by performing lower-precision interpolation filtering may not be required), so as to reduce a quantity of intermediate caches and memory operations that are required for interpolation filtering during a picture prediction process, and reduce calculation complexity during the picture prediction process.

The following describes a solution from a perspective of a decoder side.

Referring to FIG. 4, FIG. 4 is a schematic flowchart of another picture prediction method according to another embodiment of the present disclosure. In an example shown in FIG. 4, the another picture prediction method provided in the another embodiment of the present disclosure may include the following steps.

401. A video decoding apparatus determines W control points in a current picture block.

402. The video decoding apparatus determines motion vectors of the W control points.

The determining, by the video decoding apparatus, motion vectors of the W control points may include: determining a candidate motion information unit set corresponding to each of the W control points, where the candidate motion information unit set corresponding to each control point includes at least one candidate motion information unit; determining a combined motion information unit set e including W motion information units, where each motion information unit in the combined motion information unit set e is selected from at least some motion information units in the candidate motion information unit set corresponding to each of the W control points, and each combined motion information unit in the combined motion information unit set e includes a motion vector; and performing prediction or motion estimation on W motion vectors in the combined motion information unit set e to obtain the motion vectors of the W control points, or using W motion vectors included in the combined motion information unit set e as the motion vectors of the W control points.

In some possible implementations of the present disclosure, precision of each motion vector in the candidate motion information unit set may be 1/n of pixel precision.

403. The video decoding apparatus obtains, by means of calculation, motion vectors of P pixel units of the current picture block by using a motion model and the motion vectors of the W control points.

P is a positive integer, and W and N are integers greater than 1.

The P pixel units are some or all of pixel units of the current picture block.

A motion vector of each of the P pixel units is used to determine a corresponding reference pixel unit, in a reference picture, of a corresponding pixel unit. Therefore, the motion vector of each of the P pixel units may be used to determine the corresponding reference pixel unit, in the reference picture, of the corresponding pixel unit.

Precision of the determined motion vectors of the W control points is 1/n of the pixel precision.

Precision of the motion vector that is obtained by means of calculation and that is of each of the P pixel units is 1/N of the pixel precision.

W, n, and N are integers greater than 1.

N is greater than n. P is a positive integer.

Because N is greater than n, the precision of the motion vector that is obtained by means of calculation and that is of each of the P pixel units is higher than the precision of the determined motion vectors of the W control points. That is, the higher-precision motion vectors of the P pixel units of the current picture block are obtained.

In some possible implementations of the present disclosure, the motion vectors of the W control points are predicted based on a motion vector, whose precision is 1/n of the pixel precision, of an encoded picture block or a decoded picture block that surrounds the current picture block, where n is a positive integer, and n is less than N.

In some possible implementations of the present disclosure, when the motion vectors of the W control points are based on predicted values, precision of the predicted values is also 1/n of the pixel precision, and differences between the motion vectors, whose precision is 1/n of the pixel precision, of the control points and the corresponding predicted values may be written into a bitstream.

In some possible implementations of the present disclosure, the motion model may be, for example, a translational motion model, an affine motion model, a rotational motion model, a parabolic motion model, a shearing motion model, a zooming motion model, a perspective motion model, or a bilinear motion model.

For example, in some possible implementations of the present disclosure, the motion model may be represented as follows when W is equal to 2:

$$\begin{cases} v_{Nx} = \left( \frac{(v_{1x}-v_{0x}) \times N}{L} x - \frac{(v_{1y}-v_{0y}) \times N}{L} y + Nv_{0x} \right) / n \\ v_{Ny} = \left( \frac{(v_{1y}-v_{0y}) \times N}{L} x + \frac{(v_{1x}-v_{0x}) \times N}{L} y + Nv_{0y} \right) / n \end{cases} ; \text{ or}$$

$$\begin{cases} v_{Nx} = \frac{(v_{1x}-v_{0x}) \times (N/n)}{L} x - \frac{(v_{1y}-v_{0y}) \times (N/n)}{L} y + (N/n)v_{0x} \\ v_{Ny} = \frac{(v_{1y}-v_{0y}) \times (N/n)}{L} x + \frac{(v_{1x}-v_{0x}) \times (N/n)}{L} y + (N/n)v_{0y} \end{cases},$$

where

L represents a width or a height of the current picture block, $(v_{0x},v_{0y})$ and $(v_{1x},v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

For another example, in some possible implementations of the present disclosure, the motion model may be represented as follows when W is equal to 3:

$$\begin{cases} v_{Nx} = \left( \frac{(v_{1x}-v_{0x}) \times N}{w} x + \frac{(v_{2x}-v_{0x}) \times N}{h} y + Nv_{0x} \right) / n \\ v_{Ny} = \left( \frac{(v_{1y}-v_{0y}) \times N}{w} x + \frac{(v_{2y}-v_{0y}) \times N}{h} y + Nv_{0y} \right) / n \end{cases} ; \text{ or}$$

$$\begin{cases} v_{Nx} = \frac{(v_{1x}-v_{0x}) \times (N/n)}{w} x + \frac{(v_{2x}-v_{0x}) \times (N/n)}{h} y + (N/n)v_{0x} \\ v_{Ny} = \frac{(v_{1y}-v_{0y}) \times (N/n)}{w} x + \frac{(v_{2y}-v_{0y}) \times (N/n)}{h} y + (N/n)v_{0y} \end{cases},$$

where $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x},v_{0y})$, $(v_{1x},v_{1y})$, and $(v_{2x},v_{2y})$ represent motion vectors, whose precision is 1/n of the pixel precision, of three control points, w represents a width of the current picture block, and h represents a height of the current picture block.

The foregoing examples are described by using the affine motion model. When a translational motion model, a rotational motion model, a shearing motion model, a zooming motion model, a perspective motion model, a parabolic motion model, a bilinear motion model, or the like is used, reference may be made to the foregoing examples. Details are not described herein again.

404. The video decoding apparatus determines a corresponding reference pixel unit, in a reference picture, of each of the P pixel units by using a motion vector of each of the P pixel units.

Optionally, in some possible implementations of the present disclosure, the determining the corresponding reference pixel unit, in the reference picture, of each of the P pixel units by using the motion vector of each of the P pixel units may include: obtaining, by means of calculation, an integer-pixel location of each of the P pixel units by using the motion vector of each of the P pixel units; and searching, by using the motion vector of each of the P pixel units, the reference picture for a reference pixel unit corresponding to the integer-pixel location of each of the P pixel units, where the reference pixel unit that is corresponding to the integer-pixel location of each of the P pixel units and that is found in the reference picture is the reference pixel unit, in the reference picture, of each of the P pixel units.

Specifically, for example, an integer-pixel location of a pixel unit i may be obtained by means of calculation by using a motion vector of the pixel unit i of the P pixel units, and the reference picture may be searched, by using the motion vector of the pixel unit i, for a reference pixel unit corresponding to the integer-pixel location of the pixel unit i, where the reference pixel unit that is corresponding to the integer-pixel location of the pixel unit i and that is found in the reference picture is a reference pixel unit, in the reference picture, of the pixel unit i. The pixel unit i may be any one of the P pixel units. For example, the corresponding reference pixel unit, in the reference picture, of each of the P pixel units may be determined according to a manner similar to that of determining the reference pixel unit, in the reference picture, of the pixel unit i.

In some possible implementations of the present disclosure, the obtaining, by means of calculation, an integer-pixel location of each of the P pixel units by using the motion vector of each of the P pixel units includes:

obtaining, by means of calculation, the integer-pixel location of each of the P pixel units according to the following formula by using the motion vector of each of the P pixel units:

$x\text{Int}=[v_{Nx}/N]$, or $x\text{Int}=v_{Nx}\geq M$;

$y\text{Int}=[v_{Ny}/N]$, or $y\text{Int}=v_{Ny}\geq M$;

where

M is equal to $\log_2 N$ when N is an integral power of 2, (xInt, yInt) represents integer-pixel location coordinates of a pixel unit with coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

405. The video decoding apparatus performs interpolation filtering on a pixel of the reference pixel unit, in the reference picture, of each of the P pixel units by using an interpolation filter with a phase of Q, to obtain a predicted pixel value of each of the P pixel units.

Q is an integer greater than n.

In some possible implementations of the present disclosure, a value of N may be a preset fixed value, and Q may be greater than or equal to N. When the value of N may be a preset fixed value, it indicates that the precision of the motion vectors, obtained by means of calculation by using the motion model and the motion vectors of the W control points, of the P pixel units of the current picture block is unnecessarily related to a size of the current picture block. In other words, for example, based on the solution of this embodiment, the predicted pixel value with preset fixed precision can be obtained without an intermediate process for obtaining a lower-precision predicted pixel value by performing lower-precision interpolation filtering.

For example, W may be equal to 2, 3, 4, 5, 6, 8, or another value.

For example, P may be equal to 1, 2, 3, 4, 5, 6, 8, 10, 15, 16, 21, 32, 64, or another value.

For example, Q may be equal to 128, 9, 18, 24, 256, 8, 10, 15, 16, 21, 32, 64, or another value.

For example, N may be equal to 128, 9, 18, 24, 256, 8, 10, 15, 16, 21, 32, 64, or another value.

For example, n may be equal to 8, 2, 4, or another value.

In some possible implementations of the present disclosure, N may be an integral power of 2, or certainly, N may be another positive integer.

In some possible implementations of the present disclosure, the performing interpolation filtering on a pixel of the corresponding reference pixel unit, in the reference picture, of each of the P pixel units by using an interpolation filter with a phase of Q includes:

obtaining, by means of calculation, a phase of each of the P pixel units by using the motion vector of each of the P pixel units; determining, based on the phase of each pixel unit, the interpolation filter with the phase of Q that is corresponding to the corresponding pixel unit, where a filter coefficient used by the interpolation filter is corresponding to the phase; and performing interpolation filtering on the pixel of the corresponding reference pixel unit, in the reference picture, of each pixel unit by using the determined interpolation filter with the phase of Q that is corresponding to the corresponding pixel unit.

Specifically, for example, a phase of the pixel unit i may be obtained by means of calculation by using the motion vector of the pixel unit i of the P pixel units; an interpolation filter with a phase of Q that is corresponding to the pixel unit i may be determined based on the phase of the pixel unit i, where a filter coefficient used by the interpolation filter is corresponding to the phase; and interpolation filtering may be performed on a pixel of the corresponding reference pixel unit, in the reference picture, of the pixel unit i by using the determined interpolation filter with the phase of Q that is corresponding to the pixel unit i. The pixel unit i may be any one of the P pixel units. For example, interpolation filtering may be performed on each of the P pixel units according to a manner similar to that of performing interpolation filtering on the pixel unit i.

In some possible implementations of the present disclosure, the obtaining, by means of calculation, a phase of each of the P pixel units by using the motion vector of each of the P pixel units includes: obtaining, by means of calculation, the phase of each of the P pixel units according to the following formula by using the motion vector of each of the P pixel units:

$X'=\text{abs}(v_{Nx})\%N$, or $X'=v_{Nx}\&((1\leq M)-1)$.

$Y'=\text{abs}(v_{Ny})\%N$, or $Y'=v_{Ny}\&((1\leq M)-1)$.

where

M is equal to $\log_2 N$ when N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the phase includes a horizontal phase and a vertical phase; and the determining, based on the phase of each pixel unit, the interpolation filter with the phase of Q that is corresponding to the pixel unit includes: determining, based on the horizontal phase of each pixel unit, a horizontal interpolation filter with a phase of Q that is corresponding to the corresponding pixel unit; and determining, based on the vertical phase of each pixel unit, a vertical interpolation filter with a phase of Q that is corresponding to the corresponding pixel unit, where a filter coefficient used by the horizontal interpolation filter is corresponding to the horizontal phase, and a filter coefficient used by the vertical interpolation filter is corresponding to the vertical phase.

Specifically, for example, a horizontal interpolation filter with a phase of Q that is corresponding to the pixel unit i may be determined based on a horizontal phase of the pixel unit i, and a vertical interpolation filter with a phase of Q that is corresponding to the pixel unit i may be determined based on a vertical phase of the pixel unit i, where a filter coefficient used by the horizontal interpolation filter is corresponding to the horizontal phase of the pixel unit i, and a filter coefficient used by the vertical interpolation filter is corresponding to the vertical phase of the pixel unit i. The pixel unit i may be any one of the P pixel units. For example, the interpolation filter with the phase of Q that is corresponding to each of the P pixel units may be determined according to a manner similar to that of determining the interpolation filter with the phase of Q that is corresponding to the pixel unit i.

Optionally, in some possible implementations of the present disclosure, the performing interpolation filtering on the pixel of the corresponding reference pixel unit, in the reference picture, of each pixel unit by using the determined interpolation filter with the phase of Q that is corresponding to the pixel unit includes:

performing horizontal interpolation filtering on the pixel of the corresponding reference pixel unit, in the reference picture, of the pixel unit i by using the determined horizontal interpolation filter with the phase of Q that is corresponding to the pixel unit i, to obtain a horizontal interpolation filtering result; and performing vertical interpolation filtering on the horizontal interpolation filtering result by using the determined vertical interpolation filter with the phase of Q that is corresponding to the pixel unit i, to obtain a predicted pixel value of the pixel unit i, where the pixel unit i is any one of the P pixel units; or performing vertical interpolation filtering on a pixel of a corresponding reference pixel unit, in the reference picture, of a pixel unit j by using a determined vertical interpolation filter with a phase of Q that is corresponding to the pixel unit j, to obtain a vertical interpolation filtering result; and performing horizontal interpolation filtering on the vertical interpolation filtering result by using a determined horizontal interpolation filter with a phase of Q that is corresponding to the pixel unit j, to obtain a predicted pixel value of the pixel unit j, where the pixel unit j is any one of the P pixel units.

In addition, if a pixel unit has only one phase (that is, has only a horizontal phase or a vertical phase), interpolation filtering needs to be performed on a pixel of a reference pixel unit of the pixel unit only once, to obtain a predicted pixel value of the pixel unit.

406. The video decoding apparatus reconstructs the current picture block by using a predicted pixel value of the current picture block and a predicted residual, in a video bitstream, of the current picture block.

It can be learnt from the foregoing that, in the solution of this embodiment, the video decoding apparatus obtains, by means of calculation, the motion vector, whose precision is 1/N of the pixel precision, of each pixel unit of the current picture block by using the motion model and the motion vectors, whose precision is 1/n of the pixel precision, of the W control points, where N is greater than n. In other words, the precision of the motion vector that is obtained by means of calculation and that is of each pixel unit of the current picture block is higher than the precision of the determined motion vectors of the W control points. The higher-precision motion vector is obtained first. Therefore, the higher-precision motion vector of each pixel unit of the current picture block is used to determine the corresponding reference pixel unit, in the reference picture, of each pixel unit of the current picture block, and interpolation filtering is performed on the pixel of the corresponding reference pixel unit, in the reference picture, of each pixel unit of the current picture block by using the interpolation filter with the phase of Q (Q is greater than n), to obtain the predicted pixel value of each pixel unit of the current picture block. It can be learnt that, the foregoing manner helps reduce a quantity of times of interpolation filtering required for obtaining, by means of prediction, the higher-precision predicted pixel value of the current picture block (for example, an intermediate process for obtaining the lower-precision predicted pixel value by performing lower-precision interpolation filtering may not be required), so as to reduce a quantity of intermediate caches and memory operations that are required for interpolation filtering during a picture prediction process, and reduce calculation complexity during the picture prediction process.

The following describes, by using examples, some possible specific implementations of determining a combined motion information unit set e including W motion information units in the foregoing embodiments.

The determining a combined motion information unit set e including W motion information units may include: determining, from A candidate combined motion information unit sets, the combined motion information unit set e including the W motion information units, where each motion information unit included in each of the A candidate combined motion information unit sets is selected from at least some motion information units, complying with a constraint condition, in a candidate motion information unit set corresponding to each of the W control points, A is a positive integer, the A candidate combined motion information unit sets are different from each other, and each of the A candidate combined motion information unit sets includes W motion information units.

Optionally, in some possible implementations of the present disclosure, the A candidate combined motion information unit sets satisfy at least one of a first condition, a second condition, a third condition, a fourth condition, or a fifth condition.

The first condition includes: A motion manner, indicated by a motion information unit in any one of the A candidate combined motion information unit sets, of the current picture block is a non-translational motion.

The second condition includes: Prediction directions corresponding to two motion information units in any one of the A candidate combined motion information unit sets are the same.

The third condition includes: Reference-frame indexes corresponding to two motion information units in any one of the A candidate combined motion information unit sets are the same.

The fourth condition includes: An absolute value of a difference between horizontal components of motion vectors of two motion information units in any one of the A candidate combined motion information unit sets is less than or equal to a horizontal component threshold, or an absolute value of a difference between horizontal components of a motion vector of a control point Z and a motion vector of one motion information unit in any one of the A candidate combined motion information unit sets is less than or equal to a horizontal component threshold, where the control point Z of the current picture block is different from any one of the W control points.

The fifth condition includes: An absolute value of a difference between vertical components of motion vectors of two motion information units in any one of the A candidate combined motion information unit sets is less than or equal to a vertical component threshold, or an absolute value of a difference between vertical components of a motion vector of a control point Z and a motion vector of any motion information unit in one of the A candidate combined motion information unit sets is less than or equal to a vertical component threshold, where the control point Z of the current picture block is different from any one of the W control points.

Optionally, in some possible implementations of the present disclosure, the determining, from A candidate combined motion information unit sets by the video encoding/decoding apparatus, the combined motion information unit set e including the W motion information units may include: determining, from the A candidate combined motion information unit sets and based on distortion or a rate-distortion cost, the combined motion information unit set e including the W motion vectors.

Optionally, the rate-distortion cost corresponding to the combined motion information unit set e is less than or equal to a rate-distortion cost corresponding to any combined motion information unit set, other than the combined motion information unit set e, in the A candidate combined motion information unit sets.

Optionally, the distortion corresponding to the combined motion information unit set e is less than or equal to distortion corresponding to any combined motion information unit set, other than the combined motion information unit set e, in the A candidate combined motion information unit sets.

A rate-distortion cost corresponding to a candidate combined motion information unit set of the A candidate combined motion information unit sets (for example, the combined motion information unit set e of the A candidate combined motion information unit sets) may be, for example, a rate-distortion cost corresponding to a predicted pixel value that is of a picture block (for example, the current picture block) and that is obtained by means of pixel value prediction performed on the picture block by using the candidate combined motion information unit set (for example, the combined motion information unit set e).

Distortion corresponding to a candidate combined motion information unit set of the A candidate combined motion information unit sets (for example, the combined motion information unit set e of the A candidate combined motion information unit sets) may be, for example, distortion between an original pixel value of a picture block (for example, the current picture block) and a predicted pixel value that is of the picture block and that is obtained by means of pixel value prediction performed on the picture block by using the candidate combined motion information unit set (for example, the combined motion information unit set e) (that is, distortion between an original pixel value and a predicted pixel value that are of the picture block).

In some possible implementations of the present disclosure, distortion between an original pixel value of a picture block (for example, the current picture block) and a predicted pixel value that is of the picture block and that is obtained by means of pixel value prediction performed on the picture block by using a candidate combined motion information unit set (for example, the combined motion information unit set e) may be specifically, for example, a sum of squared differences (SSD), a sum of absolute differences (SAD), a sum of differences, or another distortion parametric value that can measure distortion, between the original pixel value of the picture block (for example, the current picture block) and the predicted pixel value that is of the picture block and that is obtained by means of pixel value prediction performed on the picture block by using the candidate combined motion information unit set (for example, the combined motion information unit set e).

The following describes, by using examples, some possible manners of determining W control points in a current picture block.

Optionally, in some possible implementations of the present disclosure, the W control points include W control points of an upper left control point, an upper right control point, a lower left control point, and a central control point a1 in the current picture block.

The upper left control point in the current picture block is an upper left vertex of the current picture block or a pixel block, in the current picture block, including an upper left vertex of the current picture block. The lower left control point in the current picture block is a lower left vertex of the current picture block or a pixel block, in the current picture block, including a lower left vertex of the current picture block. The upper right control point in the current picture block is an upper right vertex of the current picture block or a pixel block, in the current picture block, including an upper right vertex of the current picture block. The central control point a1 of the current picture block is a central pixel of the current picture block or a pixel block, in the current picture block, including a central pixel of the current picture block.

Optionally, in some possible implementations of the present disclosure, a candidate motion information unit set corresponding to the upper left control point in the current picture block includes a motion information unit of x1 pixel units. The x1 pixel units include at least one pixel unit (for example, picture blocks A, B, and C in FIG. 2-b) spatially adjacent to the upper left control point in the current picture block and/or at least one pixel unit temporally adjacent to the upper left control point in the current picture block, where x1 is a positive integer.

For example, the x1 pixel units may include at least one of the following: a pixel unit, in a video frame temporally adjacent to a video frame to which the current picture block belongs, whose location is the same as that of the upper left control point in the current picture block; a pixel unit that is spatially adjacent to and that is on the left of the current picture block; a pixel unit that is spatially adjacent to and that is on the upper left of the current picture block; or a pixel unit that is spatially adjacent to and that is on an upper side of the current picture block.

Optionally, in some possible implementations of the present disclosure, a candidate motion information unit set corresponding to the upper right control point in the current picture block includes a motion information unit of x2 pixel units. The x2 pixel units include at least one pixel unit (for example, picture blocks E and D in FIG. 2-b) spatially adjacent to the upper right control point in the current picture block and/or at least one pixel unit temporally adjacent to the upper right control point in the current picture block, where x2 is a positive integer.

For example, the x2 pixel units may include at least one of the following: a pixel unit, in a video frame temporally adjacent to a video frame to which the current picture block belongs, whose location is the same as that of the upper right control point in the current picture block; a pixel unit that is spatially adjacent to and that is on the right of the current picture block; a pixel unit that is spatially adjacent to and that is on the upper right of the current picture block; or a pixel unit that is spatially adjacent to and that is on an upper side of the current picture block.

Optionally, in some possible implementations of the present disclosure, a candidate motion information unit set corresponding to the lower left control point in the current picture block includes a motion information unit of x3 pixel units. The x3 pixel units include at least one pixel unit spatially adjacent to the lower left control point in the current picture block and/or at least one pixel unit temporally adjacent to the lower left control point in the current picture block, where x3 is a positive integer.

For example, the x3 pixel units may include at least one of the following: a pixel unit, in a video frame temporally adjacent to a video frame to which the current picture block belongs, whose location is the same as that of the lower left control point in the current picture block; a pixel unit that is spatially adjacent to and that is on the left of the current picture block; a pixel unit that is spatially adjacent to and that is on the lower left of the current picture block; or a pixel unit that is spatially adjacent to and that is on a lower side of the current picture block.

Optionally, in some possible implementations of the present disclosure, a candidate motion information unit set corresponding to the central control point a1 of the current picture block includes a motion information unit of x5 pixel units. One of the x5 pixel units is a pixel unit a2.

A location of the central control point a1 in a video frame to which the current picture block belongs is the same as a location of the pixel unit a2 in a video frame adjacent to the video frame to which the current picture block belongs, where x5 is a positive integer.

The following tables list a correspondence between a phase of a pixel unit and a filter coefficient.

Table 1 lists a correspondence between a filter coefficient of a 64-phase interpolation filter with a gain scale factor of 256 and a phase of a pixel unit.

Table 2 lists a correspondence between a filter coefficient of a 64-phase interpolation filter with a gain scale factor of 64 and a phase of a pixel unit.

TABLE 1

| Phase | Filter coefficient |
|---|---|
| 0 | {0, 0, 0, 256, 0, 0, 0, 0} |
| 1 | {0, 1, -3, 256, 4, -2, 0, 0} |
| 2 | {0, 2, -7, 255, 8, -3, 1, 0} |
| 3 | {-1, 3, -10, 255, 12, -4, 1, 0} |
| 4 | {-1, 4, -13, 254, 16, -5, 2, -1} |
| 5 | {-1, 5, -16, 253, 20, -7, 2, 0} |
| 6 | {-1, 6, -18, 251, 25, -9, 3, -1} |
| 7 | {-2, 7, -21, 250, 29, -10, 4, -1} |
| 8 | {-2, 8, -23, 248, 34, -12, 4, -1} |
| 9 | {-2, 8, -25, 246, 38, -13, 5, -1} |
| 10 | {-2, 9, -27, 244, 43, -15, 5, -1} |
| 11 | {-2, 10, -30, 242, 48, -16, 6, -2} |
| 12 | {-2, 10, -31, 239, 52, -17, 5, 0} |
| 13 | {-2, 10, -32, 237, 57, -18, 6, -2} |
| 14 | {-2, 11, -34, 234, 63, -21, 7, -2} |
| 15 | {-2, 11, -35, 231, 68, -21, 6, -2} |
| 16 | {-3, 13, -38, 228, 74, -24, 9, -3} |
| 17 | {-2, 12, -38, 224, 78, -24, 7, -1} |
| 18 | {-3, 14, -40, 221, 84, -27, 10, -3} |
| 19 | {-2, 12, -39, 217, 88, -27, 8, -1} |
| 20 | {-3, 13, -40, 213, 94, -28, 9, -2} |
| 21 | {-3, 15, -43, 210, 100, -31, 11, -3} |
| 22 | {-3, 13, -41, 205, 104, -30, 9, -1} |
| 23 | {-3, 12, -41, 201, 110, -31, 9, -1} |
| 24 | {-3, 15, -43, 197, 116, -35, 12, -3} |
| 25 | {-3, 14, -43, 192, 121, -35, 12, -2} |
| 26 | {-2, 13, -42, 187, 126, -35, 10, -1} |
| 27 | {-3, 14, -43, 183, 132, -37, 12, -2} |
| 28 | {-2, 13, -42, 178, 137, -38, 12, -2} |
| 29 | {-3, 14, -42, 173, 143, -39, 12, -2} |
| 30 | {-3, 15, -43, 169, 148, -41, 14, -3} |
| 31 | {-3, 13, -41, 163, 153, -40, 13, -2} |
| 32 | {-3, 13, -40, 158, 158, -40, 13, -3} |
| 33 | {-2, 13, -40, 153, 163, -41, 13, -3} |
| 34 | {-3, 14, -41, 148, 169, -43, 15, -3} |
| 35 | {-2, 12, -39, 143, 173, -42, 14, -3} |
| 36 | {-2, 12, -38, 137, 178, -42, 13, -2} |
| 37 | {-2, 12, -37, 132, 183, -43, 14, -3} |
| 38 | {-1, 10, -35, 126, 187, -42, 13, -2} |
| 39 | {-2, 12, -35, 121, 192, -43, 14, -3} |
| 40 | {-3, 12, -35, 116, 197, -43, 15, -3} |
| 41 | {-1, 9, -31, 110, 201, -41, 12, -3} |
| 42 | {-1, 9, -30, 104, 205, -41, 13, -3} |
| 43 | {-3, 11, -31, 100, 210, -43, 15, -3} |
| 44 | {-2, 9, -28, 94, 213, -40, 13, -3} |
| 45 | {-1, 8, -27, 88, 217, -39, 12, -2} |
| 46 | {-3, 10, -27, 84, 221, -40, 14, -3} |
| 47 | {-1, 7, -24, 78, 224, -38, 12, -2} |
| 48 | {-3, 9, -24, 74, 228, -38, 13, -3} |
| 49 | {-2, 6, -21, 68, 231, -35, 11, -2} |
| 50 | {-2, 7, -21, 63, 234, -34, 11, -2} |
| 51 | {-2, 6, -18, 57, 237, -32, 10, -2} |
| 52 | {0, 5, -17, 52, 239, -31, 10, -2} |
| 53 | {-2, 6, -16, 48, 242, -30, 10, -2} |
| 54 | {-1, 5, -15, 43, 244, -27, 9, -2} |
| 55 | {-1, 5, -13, 38, 246, -25, 8, -2} |
| 56 | {-1, 4, -12, 34, 248, -23, 8, -2} |
| 57 | {-1, 4, -10, 29, 250, -21, 7, -2} |
| 58 | {-1, 3, -9, 25, 251, -18, 6, -1} |
| 59 | {0, 2, -7, 20, 253, -16, 5, -1} |
| 60 | {-1, 2, -5, 16, 254, -13, 4, -1} |
| 61 | {0, 1, -4, 12, 255, -10, 3, -1} |
| 62 | {0, 1, -3, 8, 255, -7, 2, 0} |
| 63 | {0, 0, -2, 4, 256, -3, 1, 0} |

TABLE 2

| Phase | Filter coefficient |
|---|---|
| 0 | {0, 0, 0, 64, 0, 0, 0, 0} |
| 1 | {0, 0, -1, 64, 1, 0, 0, 0} |
| 2 | {0, 0, -2, 64, 3, -1, 0, 0} |
| 3 | {0, 1, -2, 64, 3, -2, 0, 0} |
| 4 | {0, 1, -3, 63, 4, -1, 0, 0} |
| 5 | {0, 1, -4, 63, 5, -2, 1, 0} |
| 6 | {0, 1, -4, 63, 6, -2, 1, -1} |
| 7 | {0, 1, -5, 62, 7, -2, 1, 0} |
| 8 | {0, 2, -6, 62, 8, -3, 1, 0} |
| 9 | {0, 1, -6, 62, 10, -3, 1, -1} |
| 10 | {0, 2, -7, 61, 11, -3, 1, -1} |
| 11 | {-1, 3, -7, 60, 12, -4, 1, 0} |
| 12 | {0, 2, -8, 60, 13, -4, 1, 0} |
| 13 | {0, 2, -8, 59, 14, -4, 1, 0} |
| 14 | {0, 3, -8, 58, 16, -5, 1, -1} |
| 15 | {0, 3, -9, 58, 17, -5, 1, -1} |
| 16 | {-1, 3, -9, 57, 18, -6, 2, 0} |
| 17 | {-1, 3, -9, 56, 19, -6, 2, 0} |
| 18 | {-1, 3, -10, 55, 21, -6, 2, 0} |
| 19 | {-1, 3, -10, 54, 22, -7, 2, 1} |
| 20 | {0, 3, -10, 53, 23, -7, 2, 0} |
| 21 | {-1, 3, -10, 52, 25, -7, 2, 0} |
| 22 | {-1, 3, -10, 51, 26, -8, 2, 1} |
| 23 | {0, 3, -10, 50, 27, -8, 2, 0} |
| 24 | {-1, 3, -10, 49, 29, -8, 2, 0} |
| 25 | {-1, 3, -10, 48, 30, -8, 2, 0} |
| 26 | {-1, 3, -10, 47, 32, -9, 2, 0} |
| 27 | {-1, 3, -11, 46, 33, -9, 3, 0} |
| 28 | {-1, 3, -10, 44, 34, -9, 3, 0} |
| 29 | {-1, 3, -10, 43, 36, -9, 3, -1} |
| 30 | {-1, 3, -10, 42, 37, -10, 3, 0} |
| 31 | {-1, 4, -10, 41, 38, -10, 3, -1} |
| 32 | {-1, 4, -11, 40, 40, -11, 4, -1} |
| 33 | {-1, 3, -10, 38, 41, -10, 4, -1} |
| 34 | {0, 3, -10, 37, 42, -10, 3, -1} |
| 35 | {-1, 3, -9, 36, 43, -10, 3, -1} |
| 36 | {0, 3, -9, 34, 44, -10, 3, -1} |
| 37 | {0, 3, -9, 33, 46, -11, 3, -1} |
| 38 | {0, 2, -9, 32, 47, -10, 3, -1} |
| 39 | {0, 2, -8, 30, 48, -10, 3, -1} |
| 40 | {0, 2, -8, 29, 49, -10, 3, -1} |
| 41 | {0, 2, -8, 27, 50, -10, 3, 0} |
| 42 | {1, 2, -8, 26, 51, -10, 3, -1} |
| 43 | {0, 2, -7, 25, 52, -10, 3, -1} |
| 44 | {0, 2, -7, 23, 53, -10, 3, 0} |
| 45 | {1, 2, -7, 22, 54, -10, 3, -1} |
| 46 | {0, 2, -6, 21, 55, -10, 3, -1} |
| 47 | {0, 2, -6, 19, 56, -9, 3, -1} |
| 48 | {0, 2, -6, 18, 57, -9, 3, -1} |
| 49 | {-1, 1, -5, 17, 58, -9, 3, 0} |
| 50 | {-1, 1, -5, 16, 58, -8, 3, 0} |
| 51 | {0, 1, -4, 14, 59, -8, 2, 0} |
| 52 | {0, 1, -4, 13, 60, -8, 2, 0} |
| 53 | {0, 1, -4, 12, 60, -7, 3, -1} |
| 54 | {-1, 1, -3, 11, 61, -7, 2, 0} |
| 55 | {-1, 1, -3, 10, 62, -6, 1, 0} |
| 56 | {0, 1, -3, 8, 62, -6, 2, 0} |
| 57 | {0, 1, -2, 7, 62, -5, 1, 0} |
| 58 | {-1, 1, -2, 6, 63, -4, 1, 0} |
| 59 | {0, 1, -2, 5, 63, -4, 1, 0} |
| 60 | {0, 0, -1, 4, 63, -3, 1, 0} |
| 61 | {0, 0, -2, 3, 64, -2, 1, 0} |
| 62 | {0, 0, -1, 3, 64, -2, 0, 0} |
| 63 | {0, 0, 0, 1, 64, -1, 0, 0} |

For example, when a horizontal phase of a pixel unit is x=12, if a 64-phase interpolation filter with a gain scale factor of 256 is used, a horizontal interpolation filtering result S may be represented as follows:

$$S=((-2)\times x_0+10\times x_1+(-31)\times x_2+239\times x_3+52\times x_4+(-17)\times x_5+5\times x_6+0\times x_7)+\text{offset})/256$$

A predicted pixel value of the pixel unit may be obtained by using the horizontal interpolation filtering result S, where offset may be any integer.

The following uses some test data to present technical effects of the solutions of the embodiments of the present disclosure.

Table 3 and Table 4 provide contrast of some test performance between a conventional solution and the solutions of the embodiments of the present disclosure. Table 3 lists test performance of the conventional solution, and Table 4 lists test performance of solutions of some embodiments of the present disclosure.

TABLE 3

| Class | Sequence | Y BD-Rate | U BD-Rate | V BD-Rate | EncTime | DecTime |
| --- | --- | --- | --- | --- | --- | --- |
| Class Affine | Dolphin | −1.4% | 0.0% | −0.2% | 209.2% | 209.6% |
| | City | −4.2% | −3.8% | −4.5% | 218.5% | 169.5% |
| | Crew | −1.8% | −0.9% | −2.4% | 212.0% | 199.1% |
| | Jets | −16.5% | −17.2% | −16.3% | 252.0% | 184.5% |
| | Tractor | −27.8% | −22.3% | −22.9% | 225.5% | 343.1% |
| | Flowervase | −4.8% | −6.9% | −4.7% | 248.2% | 170.9% |
| | BlueSky | −9.5% | −6.3% | −5.2% | 237.3% | 287.1% |
| | TableCard | −6.5% | −2.9% | −4.7% | 217.7% | 218.2% |
| | SpinCalendar | −26.0% | −28.9% | −24.7% | 247.4% | 212.1% |
| Average | All | −10.9% | −9.9% | −9.5% | 229.8% | 221.6% |

TABLE 4

| Class | Sequence | Y BD-Rate | U BD-Rate | V BD-Rate | EncTime | DecTime |
| --- | --- | --- | --- | --- | --- | --- |
| Class Affine | Dolphin | −1.3% | −0.8% | −0.6% | 148.0% | 96.7% |
| | City | −4.3% | −2.6% | −4.0% | 160.3% | 102.7% |
| | Crew | −1.7% | −1.4% | −2.8% | 154.7% | 109.5% |
| | Jets | −21.3% | −19.7% | −21.2% | 175.1% | 116.3% |
| | Tractor | −29.1% | −25.3% | −25.1% | 154.4% | 125.3% |
| | Flowervase | −6.8% | −7.2% | −3.9% | 172.6% | 113.8% |
| | BlueSky | −10.1% | −8.7% | −6.8% | 165.4% | 127.5% |
| | TableCard | −6.0% | −2.7% | −4.7% | 151.8% | 109.5% |
| | SpinCalendar | −32.8% | −33.4% | −28.8% | 172.6% | 113.1% |
| Average | All | −12.6% | −11.3% | −10.9% | 161.7% | 112.7% |

It can be learnt from contrast between the foregoing two tables that, the technical solutions of the embodiments of the present disclosure have a great improvement in encoding and decoding performance compared with the prior art.

The following further provides a related apparatus configured to implement the foregoing solutions.

Figure 5:
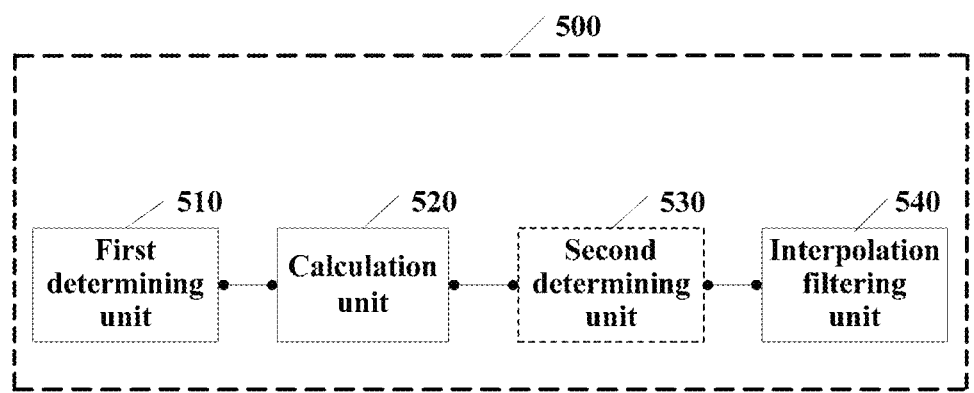
FIG. 5 is a schematic diagram of a picture prediction apparatus according to an embodiment of the present disclosure.

Referring to FIG. 5, an embodiment of the present disclosure provides a picture prediction apparatus 500, which may include a first determining unit 510, a calculation unit 520, and an interpolation filtering unit 540.

The first determining unit 510 is configured to determine motion vectors of W control points in a current picture block.

The calculation unit 520 is configured to obtain, by means of calculation, motion vectors of P pixel units of the current picture block by using a motion model and the motion vectors of the W control points, where precision of the determined motion vectors of the W control points is 1/n of pixel precision, precision of the motion vector that is obtained by means of calculation and that is of each of the P pixel units is 1/N of the pixel precision, and the P pixel units are some or all of pixel units of the current picture block.

The motion vector of each of the P pixel units is used to determine a corresponding reference pixel unit, in a reference picture, of a corresponding pixel unit. W, n, and N are integers greater than 1. N is greater than n. P is a positive integer.

The interpolation filtering unit 540 is configured to perform interpolation filtering on a pixel of the reference pixel unit, in the reference picture, of each of the P pixel units by using an interpolation filter with a phase of Q, to obtain a predicted pixel value of each of the P pixel units.

The picture prediction apparatus 500 may further include a second determining unit 530, configured to determine the corresponding reference pixel unit, in the reference picture, of each of the P pixel units by using the motion vector of each of the P pixel units.

Optionally, in some possible implementations of the present disclosure, a value of N is a preset fixed value, and Q is less than or equal to N.

Optionally, in some possible implementations of the present disclosure, a horizontal component or a vertical component of one of the motion vectors of the W control points is amplified N times in the motion model by using N, or a component difference between motion vectors of any two of the W control points is amplified N times in the motion model by using N.

Optionally, in some possible implementations of the present disclosure, the second determining unit 530 is specifically configured to: obtain, by means of calculation, an integer-pixel location of each of the P pixel units by using the motion vector of each of the P pixel units; and search, by using the motion vector of each of the P pixel units, the reference picture for a reference pixel unit corresponding to the integer-pixel location of each of the P pixel units, where the reference pixel unit that is corresponding to the integer-pixel location of each of the P pixel units and that is found in the reference picture is the reference pixel unit, in the reference picture, of each of the P pixel units.

Optionally, in some possible implementations of the present disclosure, in an aspect of obtaining, by means of calculation, an integer-pixel location of each of the P pixel units by using the motion vector of each of the P pixel units, the second determining unit 530 is specifically configured to:

obtain, by means of calculation, the integer-pixel location of each of the P pixel units according to the following formula by using the motion vector of each of the P pixel units:

$$x\text{Int}=[v_{Nx}/N], \text{ or } x\text{Int}=v_{Nx}\geq M;$$

$$y\text{Int}=[v_{Ny}/N], \text{ or } y\text{Int}=v_{Ny}\geq M;$$

where

M is equal to $\log_2 N$ when N is an integral power of 2, (xInt, yInt) represents integer-pixel location coordinates of a pixel unit with coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the interpolation filtering unit is specifically configured to: obtain, by means of calculation, a phase of each of the P pixel units by using the motion vector of each of the P pixel units; determine, based on the phase of each pixel unit, the interpolation filter with the phase of Q that is corresponding to the corresponding pixel unit, where a filter coefficient used by the interpolation filter is corresponding to the phase; and perform interpolation filtering on the pixel of the corresponding reference pixel unit, in the reference picture, of each pixel unit by using the determined interpolation filter with the phase of Q that is corresponding to the corresponding pixel unit.

Optionally, in some possible implementations of the present disclosure, in an aspect of obtaining, by means of calculation, a phase of each of the P pixel units by using the motion vector of each of the P pixel units, the interpolation filtering unit is specifically configured to obtain, by means of calculation, the phase of each of the P pixel units according to the following formula by using the motion vector of each of the P pixel units:

$$X'=\text{abs}(v_{Nx})\%N, \text{ or } X'=v_{Nx}\&((1\leq M)-1);$$

$$Y'=\text{abs}(v_{Ny})\%N, \text{ or } Y'=v_{Ny}\&((1\leq M)-1);$$

where

M is equal to $\log_2 N$ when N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the phase includes a horizontal phase and a vertical phase; and in an aspect of determining, based on the phase of each pixel unit, the interpolation filter with the phase of Q that is corresponding to the corresponding pixel unit, the interpolation filtering unit is specifically configured to: determine, based on the horizontal phase of each pixel unit, a horizontal interpolation filter with a phase of Q that is corresponding to the corresponding pixel unit; and determine, based on the vertical phase of each pixel unit, a vertical interpolation filter with a phase of Q that is corresponding to the corresponding pixel unit, where a filter coefficient used by the horizontal interpolation filter is corresponding to the horizontal phase, and a filter coefficient used by the vertical interpolation filter is corresponding to the vertical phase.

Optionally, in some possible implementations of the present disclosure, in an aspect of performing interpolation filtering on the pixel of the corresponding reference pixel unit, in the reference picture, of each pixel unit by using the determined interpolation filter with the phase of Q that is corresponding to the corresponding pixel unit, the interpolation filtering unit is specifically configured to:

perform horizontal interpolation filtering on a pixel of a corresponding reference pixel unit, in the reference picture, of a pixel unit i by using a determined horizontal interpolation filter with a phase of Q that is corresponding to the pixel unit i, to obtain a horizontal interpolation filtering result; and perform vertical interpolation filtering on the horizontal interpolation filtering result by using a determined vertical interpolation filter with a phase of Q that is corresponding to the pixel unit i, to obtain a predicted pixel value of the pixel unit i, where the pixel unit i is any one of the P pixel units; or perform vertical interpolation filtering on a pixel of a corresponding reference pixel unit, in the reference picture, of a pixel unit j by using a determined vertical interpolation filter with a phase of Q that is corresponding to the pixel unit j, to obtain a vertical interpolation filtering result; and perform horizontal interpolation filtering on the vertical interpolation filtering result by using a determined horizontal interpolation filter with a phase of Q that is corresponding to the pixel unit j, to obtain a predicted pixel value of the pixel unit j, where the pixel unit j is any one of the P pixel units.

Optionally, in some possible implementations of the present disclosure, the motion model is a translational motion model, an affine motion model, a rotational motion model, a zooming motion model, a parabolic motion model, a shearing motion model, a perspective motion model, or a bilinear motion model.

Optionally, in some possible implementations of the present disclosure, the motion model is represented as follows when W is equal to 2:

$$\begin{cases} v_{Nx} = \left(\dfrac{(v_{1x}-v_{0x})\times N}{L}x - \dfrac{(v_{1y}-v_{0y})\times N}{L}y + Nv_{0x}\right)/n \\ v_{Ny} = \left(\dfrac{(v_{1y}-v_{0y})\times N}{L}x + \dfrac{(v_{1x}-v_{0x})\times N}{L}y + Nv_{0y}\right)/n \end{cases}; \text{ or}$$

$$\begin{cases} v_{Nx} = \dfrac{(v_{1x}-v_{0x})\times (N/n)}{L}x - \dfrac{(v_{1y}-v_{0y})\times (N/n)}{L}y + (N/n)v_{0x} \\ v_{Ny} = \dfrac{(v_{1y}-v_{0y})\times (N/n)}{L}x + \dfrac{(v_{1x}-v_{0x})\times (N/n)}{L}y + (N/n)v_{0y} \end{cases},$$

where

L represents a width or a height of the current picture block, $(v_{0x},v_{0y})$ and $(v_{1x},v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the motion model is represented as follows when W is equal to 3:

$$\begin{cases} v_{Nx} = \left( \dfrac{(v_{1x}-v_{0x}) \times N}{w} x + \dfrac{(v_{2x}-v_{0x}) \times N}{h} y + Nv_{0x} \right) / n \\ v_{Ny} = \left( \dfrac{(v_{1y}-v_{0y}) \times N}{w} x + \dfrac{(v_{2y}-v_{0y}) \times N}{h} y + Nv_{0y} \right) / n \end{cases} ; \text{ or}$$

$$\begin{cases} v_{Nx} = \dfrac{(v_{1x}-v_{0x}) \times (N/n)}{w} x + \dfrac{(v_{2x}-v_{0x}) \times (N/n)}{h} y + (N/n)v_{0x} \\ v_{Ny} = \dfrac{(v_{1y}-v_{0y}) \times (N/n)}{w} x + \dfrac{(v_{2y}-v_{0y}) \times (N/n)}{h} y + (N/n)v_{0y} \end{cases},$$

where $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x}, v_{0y})$, $(v_{1x}, v_{1y})$, and $(v_{2x}, v_{2y})$ represent motion vectors, whose precision is 1/n of the pixel precision, of three control points, w represents a width of the current picture block, and h represents a height of the current picture block.

Optionally, in some possible implementations of the present disclosure, the motion vectors of the W control points are predicted based on a motion vector, whose precision is 1/n of the pixel precision, of an encoded picture block or a decoded picture block that surrounds the current picture block.

Optionally, in some possible implementations of the present disclosure, the picture prediction apparatus 500 is applied to a video encoding apparatus, or the picture prediction apparatus 500 is applied to a video decoding apparatus.

It can be understood that, functions of the functional modules of the picture prediction apparatus 500 in this embodiment may be specifically implemented according to the methods in the foregoing method embodiments. For a specific implementation process of the picture prediction apparatus 500, reference may be made to related descriptions in the foregoing method embodiments. Details are not described herein again. The picture prediction apparatus 500 may be any apparatus that needs to output or play a video, for example, a notebook computer, a tablet computer, a personal computer, a mobile phone, or another device.

It can be learnt that, in this embodiment, the picture prediction apparatus 500 obtains, by means of calculation, the motion vector, whose precision is 1/N of the pixel precision, of each pixel unit of the current picture block by using the motion model and the motion vectors, whose precision is 1/n of the pixel precision, of the W control points, where N is greater than n. In other words, the precision of the motion vector that is obtained by means of calculation and that is of each pixel unit of the current picture block is higher than the precision of the determined motion vectors of the W control points. The higher-precision motion vector is obtained first. Therefore, the higher-precision motion vector of each pixel unit of the current picture block is used to determine the corresponding reference pixel unit, in the reference picture, of each pixel unit of the current picture block, and interpolation filtering is performed on the pixel of the corresponding reference pixel unit, in the reference picture, of each pixel unit of the current picture block by using the interpolation filter with the phase of Q (Q is greater than n), to obtain the predicted pixel value of each pixel unit of the current picture block. It can be learnt that, the foregoing manner helps reduce a quantity of times of interpolation filtering required for obtaining, by means of prediction, the higher-precision predicted pixel value of the current picture block (for example, an intermediate process for obtaining a lower-precision predicted pixel value by performing lower-precision interpolation filtering may not be required), so as to reduce a quantity of intermediate caches and memory operations that are required for interpolation filtering during a picture prediction process, and reduce calculation complexity during the picture prediction process.

Figure 6:
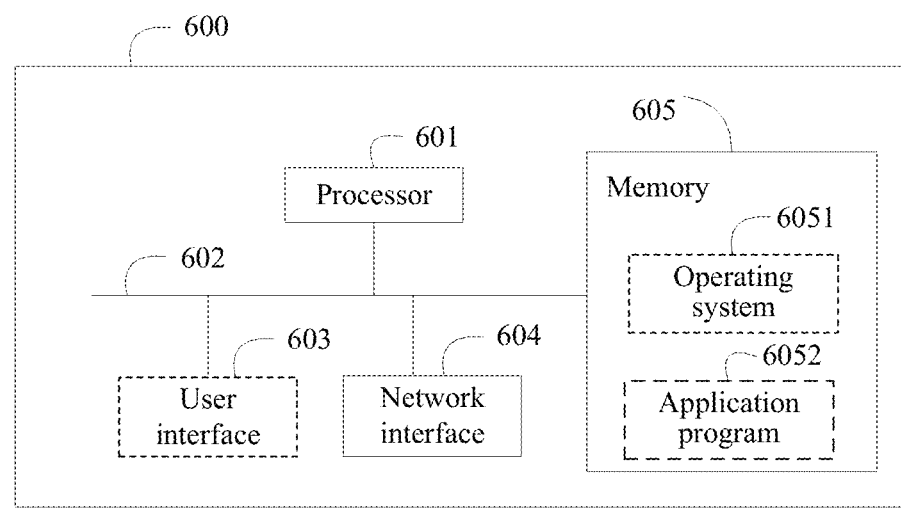
FIG. 6 is a schematic diagram of another picture prediction apparatus according to an embodiment of the present disclosure.

Referring to FIG. 6, FIG. 6 is a structural block diagram of a picture prediction apparatus 600 according to another embodiment of the present disclosure. The picture prediction apparatus 600 may include at least one processor 601, a memory 605, and at least one communications bus 602. The communications bus 602 is configured to implement a connection and communication between the components.

The picture prediction apparatus 600 may optionally include at least one network interface 604 and/or a user interface 603. The user interface 603 may include a display (for example, holographic imaging device, a cathode-ray tube, or a projector), a pointing device (for example, a mouse, a trackball, a touch panel, or a touchscreen), a camera and/or a sound pickup apparatus, or the like.

The memory 605 may include a read-only memory and a random access memory, and provide an instruction and data for the processor 601. A part of the memory 605 may further include a non-volatile random access memory.

In some implementations, the memory 605 stores the following elements: an executable module or a data structure, their subsets, or their extended sets; and the memory 605 includes:

an operating system 6051, including various system programs, and configured to implement various basic services and handle hardware-based tasks; and an application program module 6052, including various application programs, and configured to implement various application services.

In this embodiment of the present disclosure, by invoking the program or the instruction that is stored in the memory 605, the processor 601 is configured to: determine motion vectors of W control points in a current picture block; obtain, by means of calculation, motion vectors of P pixel units of the current picture block by using a motion model and the motion vectors of the W control points, where precision of the determined motion vectors of the W control points is 1/n of pixel precision, precision of the motion vector that is obtained by means of calculation and that is of each of the P pixel units is 1/N of the pixel precision, the P pixel units are some or all of pixel units of the current picture block, the motion vector of each of the P pixel units is used to determine a corresponding reference pixel unit, in a reference picture, of a corresponding pixel unit, W, n, and N are integers greater than 1, N is greater than n, and P is a positive integer; and perform interpolation filtering on a pixel of the corresponding reference pixel unit, in the reference picture, of each of the P pixel units by using an interpolation filter with a phase of Q, to obtain a predicted pixel value of each of the P pixel units, where Q is an integer greater than n.

Optionally, in some possible implementations of the present disclosure, a value of N is a preset fixed value, and Q is less than or equal to N.

Optionally, in some possible implementations of the present disclosure, a horizontal component or a vertical component of one of the motion vectors of the W control points is amplified N times in the motion model by using N, or a component difference between motion vectors of any two of the W control points is amplified N times in the motion model by using N.

Optionally, in some possible implementations of the present disclosure, the determining, by the processor, a corresponding reference pixel unit, in a reference picture, of each of the P pixel units by using the motion vector of each of the P pixel units includes:

obtaining, by means of calculation, an integer-pixel location of each of the P pixel units by using the motion vector of each of the P pixel units; and searching, by using the motion vector of each of the P pixel units, the reference picture for a reference pixel unit corresponding to the integer-pixel location of each of the P pixel units, where the reference pixel unit that is corresponding to the integer-pixel location of each of the P pixel units and that is found in the reference picture is the reference pixel unit, in the reference picture, of each of the P pixel units.

Optionally, in some possible implementations of the present disclosure, the obtaining, by means of calculation by the processor, an integer-pixel location of each of the P pixel units by using the motion vector of each of the P pixel units includes:

obtaining, by means of calculation, the integer-pixel location of each of the P pixel units according to the following formula by using the motion vector of each of the P pixel units:

$$x\text{Int}=[v_{Nx}/N], \text{ or } x\text{Int}=v_{Nx}\gg M;$$

$$y\text{Int}=[v_{Ny}/N], \text{ or } y\text{Int}=v_{Ny}\gg M;$$

where

M is equal to $\log_2 N$ when N is an integral power of 2, (xInt, yInt) represents integer-pixel location coordinates of a pixel unit with coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the performing, by the processor, interpolation filtering on a pixel of the reference pixel unit, in the reference picture, of each of the P pixel units by using an interpolation filter with a phase of Q includes:

obtaining, by means of calculation, a phase of each of the P pixel units by using the motion vector of each of the P pixel units; determining, based on the phase of each pixel unit, the interpolation filter with the phase of Q that is corresponding to the corresponding pixel unit, where a filter coefficient used by the interpolation filter is corresponding to the phase; and performing interpolation filtering on the pixel of the corresponding reference pixel unit, in the reference picture, of each pixel unit by using the determined interpolation filter with the phase of Q that is corresponding to the corresponding pixel unit.

Optionally, in some possible implementations of the present disclosure, the obtaining, by means of calculation by the processor, a phase of each of the P pixel units by using the motion vector of each of the P pixel units includes: obtaining, by means of calculation, the phase of each of the P pixel units according to the following formula by using the motion vector of each of the P pixel units:

$$X'=\text{abs}(v_{Nx})\%N, \text{ or } X'=v_{Nx}\&((1\ll M)-1);$$

$$Y'=\text{abs}(v_{Ny})\%N, \text{ or } Y'=v_{Ny}\&((1\ll M)-1);$$

where

M is equal to $\log_2 N$ when N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the phase includes a horizontal phase and a vertical phase; and the determining, by the processor and based on the phase of each pixel unit, the interpolation filter with the phase of Q that is corresponding to the pixel unit includes: determining, based on the horizontal phase of each pixel unit, a horizontal interpolation filter with a phase of Q that is corresponding to the corresponding pixel unit; and determining, based on the vertical phase of each pixel unit, a vertical interpolation filter with a phase of Q that is corresponding to the corresponding pixel unit, where a filter coefficient used by the horizontal interpolation filter is corresponding to the horizontal phase, and a filter coefficient used by the vertical interpolation filter is corresponding to the vertical phase.

Optionally, in some possible implementations of the present disclosure, the performing, by the processor, interpolation filtering on the pixel of the corresponding reference pixel unit, in the reference picture, of each pixel unit by using the determined interpolation filter with the phase of Q that is corresponding to the pixel unit includes:

performing horizontal interpolation filtering on a pixel of a corresponding reference pixel unit, in the reference picture, of a pixel unit i by using a determined horizontal interpolation filter with a phase of Q that is corresponding to the pixel unit i, to obtain a horizontal interpolation filtering result; and performing vertical interpolation filtering on the horizontal interpolation filtering result by using a determined vertical interpolation filter with a phase of Q that is corresponding to the pixel unit i, to obtain a predicted pixel value of the pixel unit i, where the pixel unit i is any one of the P pixel units; or performing vertical interpolation filtering on a pixel of a corresponding reference pixel unit, in the reference picture, of a pixel unit j by using a determined vertical interpolation filter with a phase of Q that is corresponding to the pixel unit j, to obtain a vertical interpolation filtering result; and performing horizontal interpolation filtering on the vertical interpolation filtering result by using a determined horizontal interpolation filter with a phase of Q that is corresponding to the pixel unit j, to obtain a predicted pixel value of the pixel unit j, where the pixel unit j is any one of the P pixel units.

Optionally, in some possible implementations of the present disclosure, the motion model is a translational motion model, an affine motion model, a rotational motion model, a parabolic motion model, a shearing motion model, a zooming motion model, a perspective motion model, or a bilinear motion model.

Optionally, in some possible implementations of the present disclosure, the motion model is represented as follows when W is equal to 2:

$$\begin{cases} v_{Nx} = \left(\dfrac{(v_{1x}-v_{0x})\times N}{L}x - \dfrac{(v_{1y}-v_{0y})\times N}{L}y + Nv_{0x}\right)\Big/n \\ v_{Ny} = \left(\dfrac{(v_{1y}-v_{0y})\times N}{L}x + \dfrac{(v_{1x}-v_{0x})\times N}{L}y + Nv_{0y}\right)\Big/n \end{cases}; \text{or}$$

$$\begin{cases} v_{Nx} = \dfrac{(v_{1x}-v_{0x})\times(N/n)}{L}x - \dfrac{(v_{1y}-v_{0y})\times(N/n)}{L}y + (N/n)v_{0x} \\ v_{Ny} = \dfrac{(v_{1y}-v_{0y})\times(N/n)}{L}x + \dfrac{(v_{1x}-v_{0x})\times(N/n)}{L}y + (N/n)v_{0y} \end{cases},$$

where

L represents a width or a height of the current picture block, $(v_{0x},v_{0y})$ and $(v_{1x},v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

Optionally, in some possible implementations of the present disclosure, the motion model is represented as follows when W is equal to 3:

$$\begin{cases} v_{Nx} = \left(\dfrac{(v_{1x}-v_{0x})\times N}{w}x + \dfrac{(v_{2x}-v_{0x})\times N}{h}y + Nv_{0x}\right)\Big/n \\ v_{Ny} = \left(\dfrac{(v_{1y}-v_{0y})\times N}{w}x + \dfrac{(v_{2y}-v_{0y})\times N}{h}y + Nv_{0y}\right)\Big/n \end{cases}; \text{or}$$

$$\begin{cases} v_{Nx} = \dfrac{(v_{1x}-v_{0x})\times(N/n)}{w}x + \dfrac{(v_{2x}-v_{0x})\times(N/n)}{h}y + (N/n)v_{0x} \\ v_{Ny} = \dfrac{(v_{1y}-v_{0y})\times(N/n)}{w}x + \dfrac{(v_{2y}-v_{0y})\times(N/n)}{h}y + (N/n)v_{0y} \end{cases},$$

where $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x},v_{0y})$ $(v_{1x},v_{1y})$, and $(v_{2x},v_{2y})$ represent motion vectors, whose precision is 1/n of the pixel precision, of three control points, w represents a width of the current picture block, and h represents a height of the current picture block.

Optionally, in some possible implementations of the present disclosure, the motion vectors of the W control points are predicted based on a motion vector, whose precision is 1/n of the pixel precision, of an encoded picture block or a decoded picture block that surrounds the current picture block.

Optionally, in some possible implementations of the present disclosure, a value of N is a preset fixed value.

Optionally, in some possible implementations of the present disclosure, the picture prediction apparatus 600 is applied to a video encoding apparatus, or the picture prediction apparatus 600 is applied to a video decoding apparatus.

It can be understood that, functions of the functional modules of the picture prediction apparatus 600 in this embodiment may be specifically implemented according to the methods in the foregoing method embodiments. For a specific implementation process of the picture prediction apparatus 600, reference may be made to related descriptions in the foregoing method embodiments. Details are not described herein again. The picture prediction apparatus 600 may be any apparatus that needs to output or play a video, for example, a notebook computer, a tablet computer, a personal computer, a mobile phone, or another device.

It can be learnt that, in the picture prediction method provided in this embodiment, the picture prediction apparatus 600 obtains, by means of calculation, the motion vector, whose precision is 1/N of the pixel precision, of each pixel unit of the current picture block by using the motion model and the motion vectors, whose precision is 1/n of the pixel precision, of the W control points, where N is greater than n. In other words, the precision of the motion vector that is obtained by means of calculation and that is of each pixel unit of the current picture block is higher than the precision of the determined motion vectors of the W control points. The higher-precision motion vector is obtained first. Therefore, the higher-precision motion vector of each pixel unit of the current picture block is used to determine the corresponding reference pixel unit, in the reference picture, of each pixel unit of the current picture block, and interpolation filtering is performed on the pixel of the corresponding reference pixel unit, in the reference picture, of each pixel unit of the current picture block by using the interpolation filter with the phase of Q (Q is greater than n), to obtain the predicted pixel value of each pixel unit of the current picture block. It can be learnt that, the foregoing manner helps reduce a quantity of times of interpolation filtering required for obtaining, by means of prediction, the higher-precision predicted pixel value of the current picture block (for example, an intermediate process for obtaining a lower-precision predicted pixel value by performing lower-precision interpolation filtering may not be required), so as to reduce a quantity of intermediate caches and memory operations that are required for interpolation filtering during a picture prediction process, and reduce calculation complexity during the picture prediction process.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or at least two units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A picture prediction method, comprising:
   determining motion vectors of W control points in a current picture block;
   obtaining, by calculation, motion vectors of P pixel units of the current picture block by using a motion model and the motion vectors of the W control points, wherein precision of the determined motion vectors of the W control points is 1/n of pixel precision, precision of the motion vector of each of the P pixel units is 1/N of the pixel precision, the motion vector of each of the P pixel units is used to determine a corresponding reference pixel unit in a reference picture of a corresponding pixel unit, W, n, and N are integers greater than 1, N is greater than n, and P is a positive integer; and
   performing interpolation filtering on a pixel of the corresponding reference pixel unit by using an interpolation filter with a phase of Q, to obtain a predicted pixel value of each of the P pixel units, wherein Q is an integer greater than n.

2. The method according to claim 1, wherein a value of N is a preset fixed value, and Q is less than or equal to N.

3. The method according to claim 1, wherein a horizontal component or a vertical component of one of the motion vectors of the W control points is amplified N times in the motion model, or a component difference between motion vectors of any two of the W control points is amplified N times in the motion model.

4. The method according to claim 1, wherein the performing interpolation filtering comprises:
   obtaining, by calculation, a phase of each of the P pixel units by using the motion vector of each of the P pixel units;
   determining, based on the phase of each of the P pixel units, the interpolation filter with the phase of Q that is corresponding to the pixel unit, wherein a filter coefficient used by the interpolation filter is corresponding to the phase; and
   performing interpolation filtering on the pixel of the corresponding pixel unit, in the reference picture, of each pixel unit by using the determined interpolation filter with the phase of Q that is corresponding to the pixel unit.

5. The method according to claim 4, wherein the obtaining the phase of each of the P pixel units comprises: obtaining the phase of each of the P pixel units according to the following formula by using the motion vector of each of the P pixel units:

$$X'=\text{abs}(v_{Nx})\%N, \text{ or } X'=v_{Nx}\&((1 \leq M)-1);$$

$$Y'=\text{abs}(v_{Ny})\%N, \text{ or } Y'=v_{Ny}\&((1 \leq M)-1);$$

wherein

M is equal to $\log_2 N$, N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

6. The method according to claim 4, wherein the phase comprises a horizontal phase and a vertical phase; and the determining the interpolation filter with the phase of Q comprises:
   determining, based on the horizontal phase of each pixel unit, a horizontal interpolation filter with a phase of Q that is corresponding to the pixel unit; and
   determining, based on the vertical phase of each pixel unit, a vertical interpolation filter with a phase of Q that is corresponding to the pixel unit, wherein a filter coefficient used by the horizontal interpolation filter is corresponding to the horizontal phase, and a filter coefficient used by the vertical interpolation filter is corresponding to the vertical phase.

7. The method according to claim 6, wherein the performing interpolation filtering comprises:
   performing horizontal interpolation filtering on a pixel of a corresponding reference pixel unit, in the reference picture, of a pixel unit i by using a determined horizontal interpolation filter with a phase of Q that is corresponding to the pixel unit i, to obtain a horizontal interpolation filtering result; and
   performing vertical interpolation filtering on the horizontal interpolation filtering result by using a determined vertical interpolation filter with a phase of Q that is corresponding to the pixel unit i, to obtain a predicted pixel value of the pixel unit i, wherein the pixel unit i is any one of the P pixel units.

8. The method according to claim 6, wherein the performing interpolation filtering comprises:
performing vertical interpolation filtering on a pixel of a corresponding pixel unit, in the reference picture, of a pixel unit j by using a determined vertical interpolation filter with a phase of Q that is corresponding to the pixel unit j, to obtain a vertical interpolation filtering result; and
performing horizontal interpolation filtering on the vertical interpolation filtering result by using a determined horizontal interpolation filter with a phase of Q that is corresponding to the pixel unit j, to obtain a predicted pixel value of the pixel unit j, wherein the pixel unit j is any one of the P pixel units.

9. The method according to claim 1, wherein the motion model is a translational motion model, an affine motion model, a rotational motion model, a parabolic motion model, a shearing motion model, a zooming motion model, a perspective motion model, or a bilinear motion model.

10. The method according to claim 1, wherein the motion model is represented as follows, wherein W is equal to 2:

$$\begin{cases} v_{Nx} = \left(\frac{(v_{1x}-v_{0x})\times N}{L}x - \frac{(v_{1y}-v_{0y})\times N}{L}y + Nv_{0x}\right)/n \\ v_{Ny} = \left(\frac{(v_{1y}-v_{0y})\times N}{L}x + \frac{(v_{1x}-v_{0x})\times N}{L}y + Nv_{0y}\right)/n \end{cases} ; \text{ or}$$

$$\begin{cases} v_{Nx} = \frac{(v_{1x}-v_{0x})\times(N/n)}{L}x - \frac{(v_{1y}-v_{0y})\times(N/n)}{L}y + (N/n)v_{0x} \\ v_{Ny} = \frac{(v_{1y}-v_{0y})\times(N/n)}{L}x + \frac{(v_{1x}-v_{0x})\times(N/n)}{L}y + (N/n)v_{0y} \end{cases},$$

wherein
L represents a width or a height of the current picture block, $(v_{0x},v_{0y})$ and $(v_{1x},v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

11. The method according to claim 1, wherein the motion model is represented as follows, wherein W is equal to 3:

$$\begin{cases} v_{Nx} = \left(\frac{(v_{1x}-v_{0x})\times N}{w}x + \frac{(v_{2x}-v_{0x})\times N}{h}y + Nv_{0x}\right)/n \\ v_{Ny} = \left(\frac{(v_{1y}-v_{0y})\times N}{w}x + \frac{(v_{2y}-v_{0y})\times N}{h}y + Nv_{0y}\right)/n \end{cases} ; \text{ or}$$

$$\begin{cases} v_{Nx} = \frac{(v_{1x}-v_{0x})\times(N/n)}{w}x + \frac{(v_{2x}-v_{0x})\times(N/n)}{h}y + (N/n)v_{0x} \\ v_{Ny} = \frac{(v_{1y}-v_{0y})\times(N/n)}{w}x + \frac{(v_{2y}-v_{0y})\times(N/n)}{h}y + (N/n)v_{0y} \end{cases},$$

wherein
$v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x},v_{0y})$, $(v_{1x},v_{1y})$, and $(v_{2x},v_{2y})$ represent motion vectors, whose precision is 1/n of the pixel precision, of three control points, w represents a width of the current picture block, and h represents a height of the current picture block.

12. The method according to claim 1, wherein the motion vectors of the W control points are predicted based on a motion vector, whose precision is 1/n of the pixel precision, of an encoded picture block or a decoded picture block that surrounds the current picture block.

13. The method according to claim 1, wherein the picture prediction method is applied to a video coding process or applied to a video decoding process.

14. A picture prediction apparatus, comprising:
a non-transitory memory storage comprising instructions; and
one or more hardware processors in communication with the memory storage, wherein the one or more hardware processors execute the instructions to:
determine motion vectors of W control points in a current picture block;
obtain, by calculation, motion vectors of P pixel units of the current picture block by using a motion model and the motion vectors of the W control points, wherein precision of the determined motion vectors of the W control points is 1/n of pixel precision, precision of the motion vector of each of the P pixel units is 1/N of the pixel precision, the motion vector of each of the P pixel units is used to determine a corresponding reference pixel unit in a reference picture of a corresponding pixel unit, W, n, and N are integers greater than 1, N is greater than n, and P is a positive integer; and
perform interpolation filtering on a pixel of the corresponding reference pixel unit by using an interpolation filter with a phase of Q, to obtain a predicted pixel value of each of the P pixel units, wherein Q is an integer greater than n.

15. The apparatus according to claim 14, wherein a value of N is a preset fixed value, and Q is less than or equal to N.

16. The apparatus according to claim 14, wherein a horizontal component or a vertical component of one of the motion vectors of the W control points is amplified N times in the motion model, or a component difference between motion vectors of any two of the W control points is amplified N times in the motion model.

17. The apparatus according to claim 14, wherein the one or more hardware processors is configured to:
obtain, by calculation, a phase of each of the P pixel units by using the motion vector of each of the P pixel units;
determine, based on the phase of each of the P pixel units, the interpolation filter with the phase of Q that is corresponding to the pixel unit, wherein a filter coefficient used by the interpolation filter is corresponding to the phase; and
perform interpolation filtering on the pixel of the corresponding pixel unit, in the reference picture, of each pixel unit by using the determined interpolation filter with the phase of Q that is corresponding to the pixel unit.

18. The apparatus according to claim 17, wherein the one or more hardware processors is configured to: obtain the phase of each of the P pixel units according to the following formula by using the motion vector of each of the P pixel units:

$$X' = \text{abs}(v_{Nx})\%N, \text{ or } X' = v_{Nx} \& ((1 \ll M)-1);$$

$$Y' = \text{abs}(v_{Ny})\%N, \text{ or } Y' = v_{Ny} \& ((1 \ll M)-1);$$

wherein

M is equal to $\log_2 N$, N is an integral power of 2, X' represents a horizontal phase of a pixel unit with coordinates of (x, y) in the current picture block, Y' represents a vertical phase of the pixel unit with the coordinates of (x, y) in the current picture block, $v_{Nx}$ represents a horizontal component of a motion vector, whose precision is 1/N of the pixel precision, of the pixel unit with the coordinates of (x, y) in the current picture block, and $v_{Ny}$ represents a vertical component of the motion vector, whose precision is 1/N of the pixel precision, of the pixel unit with the coordinates of (x, y) in the current picture block.

19. The apparatus according to claim 17, wherein the phase comprises a horizontal phase and a vertical phase; and the one or more hardware processors is configured to:

determine, based on the horizontal phase of each pixel unit, a horizontal interpolation filter with a phase of Q that is corresponding to the pixel unit; and determine, based on the vertical phase of each pixel unit, a vertical interpolation filter with a phase of Q that is corresponding to the pixel unit, wherein a filter coefficient used by the horizontal interpolation filter is corresponding to the horizontal phase, and a filter coefficient used by the vertical interpolation filter is corresponding to the vertical phase.

20. The apparatus according to claim 19, wherein the one or more hardware processors is configured to:

perform horizontal interpolation filtering on a pixel of a corresponding reference pixel unit, in the reference picture, of a pixel unit i by using a determined horizontal interpolation filter with a phase of Q that is corresponding to the pixel unit i, to obtain a horizontal interpolation filtering result; and perform vertical interpolation filtering on the horizontal interpolation filtering result by using a determined vertical interpolation filter with a phase of Q that is corresponding to the pixel unit i, to obtain a predicted pixel value of the pixel unit i, wherein the pixel unit i is any one of the P pixel units.

21. The apparatus according to claim 19, wherein the one or more hardware processors is configured to:

perform vertical interpolation filtering on a pixel of a corresponding pixel unit, in the reference picture, of a pixel unit j by using a determined vertical interpolation filter with a phase of Q that is corresponding to the pixel unit j, to obtain a vertical interpolation filtering result; and perform horizontal interpolation filtering on the vertical interpolation filtering result by using a determined horizontal interpolation filter with a phase of Q that is corresponding to the pixel unit j, to obtain a predicted pixel value of the pixel unit j, wherein the pixel unit j is any one of the P pixel units.

22. The apparatus according to claim 14, wherein the motion model is a translational motion model, an affine motion model, a rotational motion model, a parabolic motion model, a shearing motion model, a zooming motion model, a perspective motion model, or a bilinear motion model.

23. The apparatus according to claim 14, wherein the motion model is represented as follows, wherein W is equal to 2:

$$\begin{cases} v_{Nx} = \left( \dfrac{(v_{1x}-v_{0x}) \times N}{L} x - \dfrac{(v_{1y}-v_{0y}) \times N}{L} y + Nv_{0x} \right) \bigg/ n \\ v_{Ny} = \left( \dfrac{(v_{1y}-v_{0y}) \times N}{L} x + \dfrac{(v_{1x}-v_{0x}) \times N}{L} y + Nv_{0y} \right) \bigg/ n \end{cases} ; \text{or}$$

$$\begin{cases} v_{Nx} = \dfrac{(v_{1x}-v_{0x}) \times (N/n)}{L} x - \dfrac{(v_{1y}-v_{0y}) \times (N/n)}{L} y + (N/n)v_{0x} \\ v_{Ny} = \dfrac{(v_{1y}-v_{0y}) \times (N/n)}{L} x + \dfrac{(v_{1x}-v_{0x}) \times (N/n)}{L} y + (N/n)v_{0y} \end{cases},$$

wherein

L represents a width or a height of the current picture block, $(v_{0x}, v_{0y})$ and $(v_{1x}, v_{1y})$ represent motion vectors, whose precision is 1/n of the pixel precision, of two control points, $v_{Nx}$ represents a horizontal component of a motion vector, whose precision is 1/N of the pixel precision, of a pixel unit with coordinates of (x, y) in the current picture block, and $v_{Ny}$ represents a vertical component of the motion vector, whose precision is 1/N of the pixel precision, of the pixel unit with the coordinates of (x, y) in the current picture block.

24. The apparatus according to claim 14, wherein the motion model is represented as follows, wherein W is equal to 3:

$$\begin{cases} v_{Nx} = \left( \dfrac{(v_{1x}-v_{0x}) \times N}{w} x + \dfrac{(v_{2x}-v_{0x}) \times N}{h} y + Nv_{0x} \right) \bigg/ n \\ v_{Ny} = \left( \dfrac{(v_{1y}-v_{0y}) \times N}{w} x + \dfrac{(v_{2y}-v_{0y}) \times N}{h} y + Nv_{0y} \right) \bigg/ n \end{cases} ; \text{or}$$

$$\begin{cases} v_{Nx} = \dfrac{(v_{1x}-v_{0x}) \times (N/n)}{w} x + \dfrac{(v_{2x}-v_{0x}) \times (N/n)}{h} y + (N/n)v_{0x} \\ v_{Ny} = \dfrac{(v_{1y}-v_{0y}) \times (N/n)}{w} x + \dfrac{(v_{2y}-v_{0y}) \times (N/n)}{h} y + (N/n)v_{0y} \end{cases},$$

wherein $v_{Nx}$ represents a horizontal component of a motion vector, whose precision is 1/N of the pixel precision, of a pixel unit with coordinates of (x, y) in the current picture block, $v_{Ny}$ represents a vertical component of the motion vector, whose precision is 1/N of the pixel precision, of the pixel unit with the coordinates of (x, y) in the current picture block, $(v_{0x}, v_{0y})$, $(v_{1x}, v_{1y})$, and $(v_{2x}, v_{2y})$ represent motion vectors, whose precision is 1/n of the pixel precision, of three control points, w represents a width of the current picture block, and h represents a height of the current picture block.

25. The apparatus according to claim 14, wherein the motion vectors of the W control points are predicted based on a motion vector, whose precision is 1/n of the pixel precision, of an encoded picture block or a decoded picture block that surrounds the current picture block.

26. The apparatus according to claim 14, wherein the current picture block is generated in a video coding process or applied to a video decoding process.

27. A non-transitory computer-readable medium storing computer instructions, that when executed by one or more hardware processors, cause the one or more hardware processors to perform operations comprising:

determining motion vectors of W control points in a current picture block;

obtaining, by calculation, motion vectors of P pixel units of the current picture block by using a motion model and the motion vectors of the W control points, wherein precision of the determined motion vectors of the W control points is 1/n of pixel precision, precision of the motion vector of each of the P pixel units is 1/N of the pixel precision, the motion vector of each of the P pixel units is used to determine a corresponding reference pixel unit in a reference picture of a corresponding pixel unit, W, n, and N are integers greater than 1, N is greater than n, and P is a positive integer; and performing interpolation filtering on a pixel of the corresponding reference pixel unit by using an interpolation filter with a phase of Q, to obtain a predicted pixel value of each of the P pixel units, wherein Q is an integer greater than n.

\* \* \* \* \*

UNITED STATES PATENT AND TRADEMARK OFFICE
CERTIFICATE OF CORRECTION

PATENT NO. : 10,560,714 B2
APPLICATION NO. : 15/855005
DATED : February 11, 2020
INVENTOR(S) : Sixin Lin, Ruopu Huang and Haitao Yang It is certified that error appears in the above-identified patent and that said Letters Patent is hereby corrected as shown below:

In the Claims

In Column 46, Line 28, in Claim 5, delete "$log_2$ N," and insert -- $log_2 N$, --, therefor.

In Column 49, Line 2, in Claim 18, delete "$log_2$ N," and insert -- $log_2 N$, --, therefor.

Signed and Sealed this
Nineteenth Day of May, 2020

Andrei Iancu
*Director of the United States Patent and Trademark Office*